(12) United States Patent
Ogasawara

(10) Patent No.: US 7,262,820 B2
(45) Date of Patent: Aug. 28, 2007

(54) LIQUID CRYSTAL PANEL, OPTICAL PICKUP, AND INFORMATION REPRODUCING APPARATUS

(75) Inventor: Masakazu Ogasawara, Tsurugashima (JP)

(73) Assignee: Pioneer Corporation, Tokyo-to (JP)

( * ) Notice: Subject to any disclaimer, the term of this patent is extended or adjusted under 35 U.S.C. 154(b) by 40 days.

(21) Appl. No.: 10/819,348

(22) Filed: Apr. 7, 2004

(65) Prior Publication Data

US 2004/0257485 A1    Dec. 23, 2004

(30) Foreign Application Priority Data

Apr. 7, 2003    (JP)    ............................ P2003-102739

(51) Int. Cl.
G02F 1/13    (2006.01)
G02F 1/1335    (2006.01)
G11B 7/00    (2006.01)

(52) U.S. Cl. .................. 349/2; 349/18; 369/112.02
(58) Field of Classification Search ............... 349/2, 349/18; 369/112.02
See application file for complete search history.

(56) References Cited

U.S. PATENT DOCUMENTS

2001/0028028 A1*  10/2001  Iwasaki et al. ............. 250/216

2002/0001273 A1*  1/2002  Togashi .................... 369/53.19

FOREIGN PATENT DOCUMENTS

JP    2000-090479 A    3/2000
JP    2001-143309 A    5/2001

* cited by examiner

Primary Examiner—David Nelms
Assistant Examiner—Michael H. Caley
(74) Attorney, Agent, or Firm—Sughrue Mion, PLLC

(57) ABSTRACT

The transparent electrode of the liquid crystal panel includes the first partial electrode portion constituted by the pattern electrodes and the second electron portion constituted by the pattern electrodes. When the central axis of the objective lens and the central axis of the liquid crystal panel are aligned with each other, the light beam passes through the first electrode portion. In this case, wavefront aberration is compensated by providing a predetermined phase difference to the light beam in the region of the liquid crystal corresponding to the first electrode portion. When the positions are not aligned and misalignment occurs, the light beam passes through the first electrode portion and the second electrode portion. In this case, wavefront aberration is compensated by providing a predetermined phase difference to the light beam in the region of the liquid crystal corresponding to the first electrode portion and the second electrode portion.

14 Claims, 18 Drawing Sheets

CONVENTIONAL TRANSPARENT ELECTRODE ACCORDING (WITHOUT MISALIGNMENT)

TRANSPARENT ELECTRODE ACCORDING TO EMBODIMENT
(WITH MISALIGNMENT)

IN THE CASE WHERE MISALIGNMENT OCCURS
(EMBODIMTN)

LIQUID CRYSTAL PANEL, OPTICAL PICKUP, AND INFORMATION REPRODUCING APPARATUS

BACKGROUND OF THE INVENTION

1. Field of the Invention

The present invention belongs to a technical field of a liquid crystal panel, an optical pickup, and an information reproducing apparatus.

2. Description of the Related Art

Conventionally, as a liquid crystal panel for compensating wavefront aberration, a liquid crystal panel having a construction in which electrodes are disposed on both sides of a liquid crystal layer is generally used.

This liquid crystal panel is arranged so as to compensate wavefront aberration, which is caused by inclination of the optical axis, by varying the refractive index of the light beam transmitted through the liquid crystal, and utilize the change of orientation of liquid crystal molecules constituting the liquid crystal depending on the voltage applied to the liquid crystal.

Specifically, the conventional liquid crystal panel has a constitution in which the inclination of the optical axis is cancelled out by varying the applied voltages with respect to each part of the liquid crystal to vary the refractive index relative to the light beam, thereby providing phase difference different with respect to each part of the liquid crystal to the light beam, and varying the optical path length of the light beam to the information recording surface. For example, the conventional liquid crystal panel has transparent electrodes constituted by a combination of plural partial transparent electrodes for applying a voltage to the liquid crystal, and applied voltages are varied with respect to each of the partial transparent electrodes, and thereby, phase differences different with respect to each part of the liquid crystal are provided.

In the conventional liquid crystal panel, forms of plural partial transparent electrodes within one transparent electrode are generally determined on the assumption that the position of the central axis of the objective lens and the position of the central axis of the liquid crystal panel are aligned with each other, that is, on the assumption that the center of the pupil plane of the objective lens and the center of the transparent electrode are aligned with each other.

On the other hand, in the general construction of an optical pickup, the objective lens and the liquid crystal panel are often constructed separately, and, in the optical pickup, sometimes the position of the central axis of the objective lens and the position of the central axis of the liquid crystal panel have been already out of alignment due to problems of its manufacturing process.

In addition, when actually recording or reproducing information to a recording medium, the so-called tracking serve control is sometimes performed to the irradiated position of the light beam on the recording medium, for example. In this case, the objective lens is moved in the direction perpendicular to the information track formed on the recording medium by an actuator etc. Accordingly, even in the case where misalignment has not occurred in the manufacturing process, sometimes misalignment inevitably occurs between the position of the central axis of the objective lens and the position of the central axis of the liquid crystal panel.

Therefore, as measures against the misalignment, the following two technologies are mainly proposed.

The first technology is a technology of preparing two patterns of electrodes of the liquid crystal panel in advance, and thereby, the tolerance to the misalignment with the objective lens is improved (for example, see publication of Japanese Patent Application No. 2001-143309).

The second technology is a technology of dividing transparent electrodes in advance so that the wavefront aberration may become least when predetermined misalignment occurs (for example, see Publication of Japanese Patent Application No. 2000-90479).

However, when the above described misalignment occurs, in the conventional liquid crystal panel formed on the assumption that the misalignment does not exist, the wavefront aberration can not be compensated sufficiently.

In addition, in the technology as the first measure against misalignment, since two patterns of electrodes are required to be prepared as a measure against misalignment in advance, patterning and control become complicated, and costs largely increase.

Further, in the technology as the second measure against misalignment, since electrodes are set so that the wavefront aberration may become least when predetermined misalignment occurs, the aberration compensation function when no misalignment occurs becomes degraded.

SUMMARY OF THE INVENTION

Therefore, the invention is achieved in light of the above described respective problems, and an example of its challenges is to provide a liquid crystal panel and an optical pickup capable of, while performing good aberration compensation when no misalignment occurs, performing good aberration compensation also when the misalignment occurs, and preventing cost rise.

The above object of the present invention can be achieved by a liquid crystal panel of the present invention, which is disposed on an optical path of a light beam for compensating wavefront aberration that occurs between an optical axis of the light beam and an information recording surface in an recording medium by providing phase difference to the light beam. The panel is provided with: a first electrode portion constituted by plural partial electrodes for providing phase differences different with respect to each of the partial electrodes to the passing light beam; and a second electrode portion disposed adjacent to the first electrode portion and constituted by at least one partial electrode for providing phase difference different from those of the first electrode portion to the passing light beam; wherein the second electrode portion provides phase difference to the passing light beam by the partial electrode in the case where misalignment within a plane perpendicular to the optical axis occurs between a position of a central axis of a condensing device for condensing the light beam on the s information recording surface and a position of a central axis of the liquid crystal panel.

The above object of the present invention can be achieved by an optical pickup of the present invention. The pickup is provided with: a liquid crystal panel disposed on an optical path of a light beam for compensating wavefront aberration that occurs between an optical axis of the light beam and an information recording surface in an recording medium by providing phase difference to the light beam; a light source for outputting the light beam; a voltage applying device for providing the phase difference to the light beam by applying voltages to the respective the first partial electrodes and the second partial electrodes; a condensing device for condensing the light beam passing through the liquid crystal panel on the recording medium; and a light receiving device for receiving the light beam condensed by the condensing device and reflected from the recording medium and outputting a light reception signal, the liquid crystal panel including: a first electrode portion constituted by plural partial electrodes for providing phase differences different with respect to each of the partial electrodes to the passing light beam; and a second electrode portion disposed adjacent to the first electrode portion and constituted by at least one partial electrode for providing phase difference different from those of the first electrode portion to the passing light beam, wherein the second electrode portion provides phase difference to the passing light beam by the partial electrode in the case where misalignment within a plane perpendicular to the optical axis occurs between a position of a central axis of the condensing device for condensing the light beam on the information recording surface and a position of a central axis of the liquid crystal panel.

The above object of the present invention can be achieved by an information reproducing apparatus of the present invention. The apparatus is provided with: an optical pickup including a liquid crystal panel disposed on an optical path of a light beam for compensating wavefront aberration that occurs between an optical axis of the light beam and an information recording surface in an recording medium by providing phase difference to the light beam, a light source for outputting the light beam, a voltage applying device for providing the phase difference to the light beam by applying voltages to the respective the first partial electrodes and the second partial electrodes, a condensing device for condensing the light beam passing through the liquid crystal panel on the recording medium, and a light receiving device for receiving the light beam condensed by the condensing device and reflected from the recording medium and outputting a light reception signal; and a reproducing device for, when information is recorded in the recording medium, reproducing the information based on the light reception signal, the liquid crystal panel including: a first electrode portion constituted by plural partial, electrodes for providing phase differences different with respect to each of the partial electrodes to the passing light beam; and a second electrode portion disposed adjacent to the first electrode portion and constituted by at least one partial electrode for providing phase difference different from those of the first electrode portion to the passing light beam, wherein the second electrode portion provides phase difference to the passing light beam by the partial electrode in the case where misalignment within a plane perpendicular to the optical axis occurs between a position of a central axis of the condensing device for condensing the light beam on the information recording surface and a position of a central axis of the liquid crystal panel.

DESCRIPTION OF THE PREFERRED EMBODIMENTS

Hereinafter, preferred embodiments of the invention will be described according to the drawings.

Note that the embodiments described as below are embodiments according to an information reproducing apparatus for reading out recorded information while compensating produced wavefront aberration, when reading out the recorded information from an optical disk as a recording medium onto which the recorded information is recorded and a disk-form recording medium the wavefront aberration being produced due to variations in angle formed by the optical disk and the optical axis of the light beam (inclination caused by the bow of the optical disk itself and the optical disk vibration due to external vibration or rotation).

First, the overall constitution of the information reproducing apparatus according to the embodiment will be described using FIG. 1.

Figure 1:
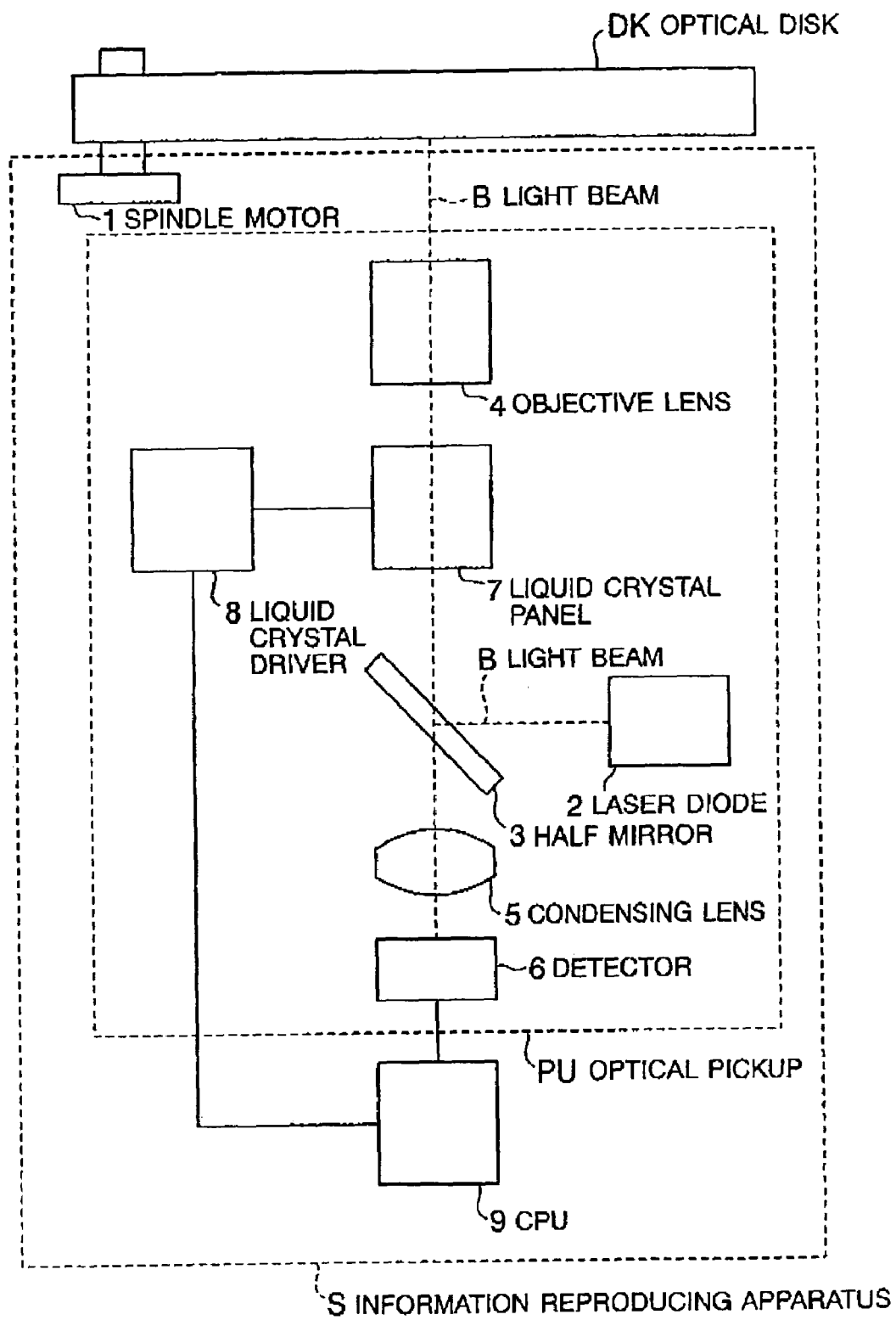
FIG. 1 is a block diagram showing an example of the overall constitution of the information reproducing apparatus according to an embodiment of the present invention.

Note that FIG. 1 is a block diagram showing an example of the overall constitution of the information reproducing apparatus of the embodiment.

As shown in FIG. 1, an information reproducing apparatus S according to the embodiment is constituted by including: a spindle motor 1 for rotating an optical disk DK with a predetermined number of rotation; an optical pickup PU for applying a light beam B to the optical disk DK while compensating produced wavefront aberration and outputting detection signals as light reception signals corresponding to recorded information on the optical disk DK based on the reflected light thereof; and a CPU (Central Processing Unit)

9 as a reproducing device of the invention for outputting the recorded information as reproduction signals based on the detection signals.

The optical pickup PU is constituted by including a laser diode 2, a half mirror 3, an objective lens 4, a condensing lens 5, a detector 6, a liquid crystal panel 7, and a liquid crystal driver 8.

Note that the liquid crystal panel 7 is fixed to the housing of the optical pickup PU.

In addition, for example, the laser diode 2 in the embodiment constitutes a light source of the invention, the objective lens 4 constitutes a condensing device of the invention, and the detector 6 constitutes a light receiving device. Further, for example, the liquid crystal panel 7 of the embodiment constitutes a liquid crystal panel of the invention, and the liquid crystal driver 8 constitutes a voltage applying device of the invention.

Here the central axis (optical axis) of the objective lens 4 and the central axis of the liquid crystal panel 7 are set in parallel to each other and their positions are aligned with each other at the time of manufacture.

In the information reproducing apparatus S, the spindle motor 1 is arranged so as to receive reproduction instructions from a control unit, which is not shown, for example, and rotationally drive the optical disk DK with a predetermined number of rotation.

The laser diode 2 is arranged to output the light beam B toward the half mirror 3.

The half mirror 3 is disposed on the optical path of the light beam B output from the laser diode 2 to reflect the light beam in the direction toward the liquid crystal panel 7.

The liquid crystal panel 7 is disposed on the optical path of the light beam B between the half mirror 3 and the objective lens 4. In addition, the liquid crystal panel 7 is arranged so as to vary orientation of liquid crystal molecules thereof depending on the voltages applied to the respective pattern electrodes, which will be described later. Further, the panel is arranged so as to provide predetermined phase difference to the light beam B reflected from the half mirror 3 to compensate wavefront aberration. A structure of the liquid crystal panel 7 and a principle of wavefront aberration compensation will be described later.

The objective lens 4 is disposed on the optical path of the light beam B between the liquid crystal panel 7 and the optical disk DK to condense the light beam B passing through the liquid crystal panel 7 onto the information recording surface of the optical disk DK.

The condensing lens 5 is arranged so as to condense the light beam B, which is reflected on the information recording surface of the optical disk DK and passes through the objective lens 4 the liquid crystal panel 7 and the half mirror 3, onto the detector 6.

The detector 6 is arranged so as to convert the received reflected light of the light beam B into detection signals as electrical signals and output them to the CPU 9.

The CPU 9 is arranged so as to receive the detection signals output by the detector 6, perform predetermined demodulation processing on the detection signals, and output them as reproduction signals corresponding to the recorded information recorded in the optical disk DK to a reproducing circuit, which is not shown.

In addition, the CPU 9 is arranged so, in parallel to the above described operation, as to detect a tilt angle in a radial (radius) direction in an area on the optical disk DK to be applied with the light beam B (hereinafter, referred to as "tilt angle in the radial direction") and a tilt angle in a tangential (circumference) direction in the area on the optical disk DK applied with the light beam B (hereinafter, referred to as "tilt angle in the tangential direction") based on the received detection signals.

By the way, since the predetermined demodulation processing and detecting method of the tilt angle performed by the CPU 9 are publicly known in the art, the specific description of the processing will be omitted.

The liquid crystal driver 8 is arranged so as to determine amounts of aberration compensation of the liquid crystal corresponding to the respective pattern electrodes, which will be described later, of the liquid crystal panel 7 based on the values of tilt angles in the radial direction and tangential direction detected in the CPU 9 using amount of compensation data that represents amounts of aberration compensation stored in advance in a ROM (Read Only Memory) etc., which is not shown, for example, and output voltages corresponding to the amounts of aberration compensation to the pattern electrodes of the transparent electrodes in the liquid crystal panel 7.

Note that the amount of aberration compensation indicates a phase difference to be provided to the light beam B passing through the liquid crystal panel 7 for canceling out wavefront aberration produced by the tilt angles in the radial direction and tangential direction.

Next, the construction of the liquid crystal panel 7 according to the embodiment will be described using FIG. 2.

Note that FIG. 2 is a sectional view showing an example of the construction of the liquid crystal panel 7 of the embodiment.

As shown in FIG. 2, the liquid crystal panel 7 of the embodiment has orientation films 7e and 7f formed with liquid crystal 7g including liquid crystal molecules M therebetween for providing predetermined molecule orientation to the liquid crystal 7g, and further has a transparent electrode 7c and a transparent electrode 7d of ITO (Indium-tin Oxide) etc., for example, formed on the outside of the orientation films 7e and 7f, respectively. In addition, glass substrates 7a and 7b as protective layers are formed on the outer most layers thereof The respective transparent electrodes 7c and 7d are divided into pattern electrodes as partial electrodes corresponding to the distribution of wavefront aberration, as described later. The transparent electrode 7c is an electrode for compensating wavefront aberration caused by the inclination of the optical axis in the radial direction, and the transparent electrode 7d is an electrode for compensating wavefront aberration caused by the inclination of the optical axis in the tangential direction.

For the liquid crystal 7g, a material having a refractive index different between the optical axis direction of the liquid crystal molecules M and the direction perpendicular thereto is used as shown in FIG. 2, and a material such as nematic liquid crystal having the so-called birefringent effect is used.

Figure 2A:
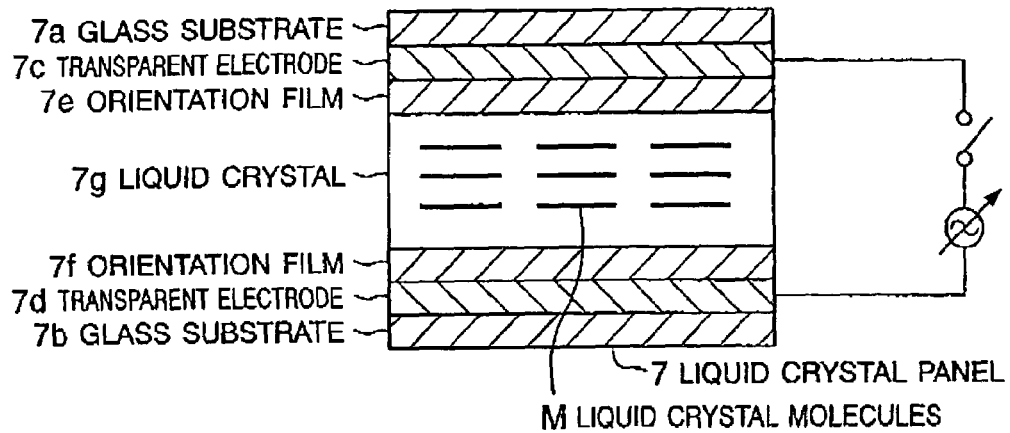
FIGS. 2A, 2B and 2C are a sectional view showing an example of the construction of the liquid crystal panel 7 of the embodiment.
Figure 2B:
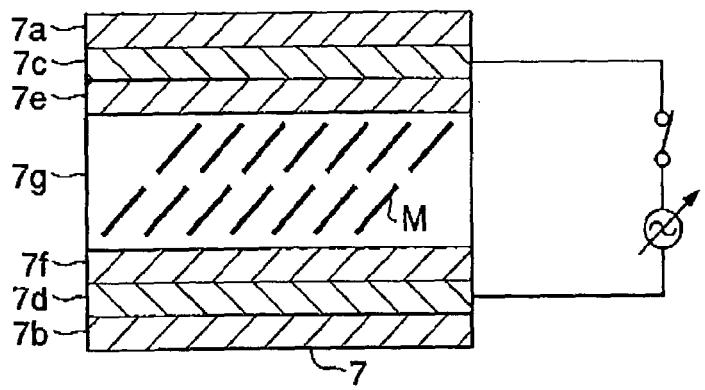
Figure 2C:
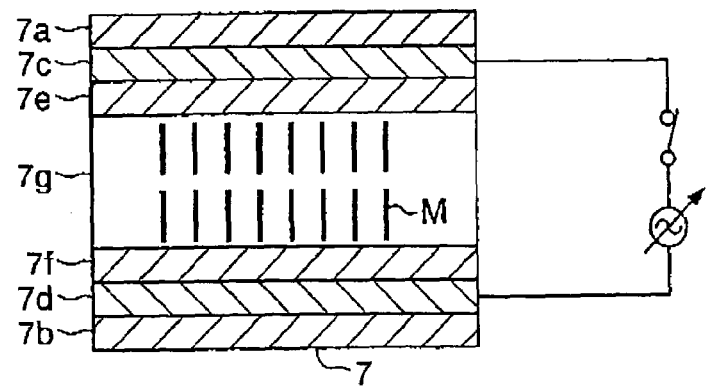

By having such constitution, the liquid crystal panel 7 can freely change the direction of the liquid crystal molecules M from the horizontal direction to the vertical direction as shown in FIGS. 2A to 2C by changing the voltage values applied to the transparent electrodes 7c and 7d by the liquid crystal driver 8, and can provide phase difference $\Delta P$ expressed by the following expression (1) to the light beam B in response to the orientation direction of the liquid crystal molecules M.

$$\Delta P = \Delta n \cdot d (2\pi/\lambda) \qquad \text{Expression (1)}$$

Where, $\Delta n$ represents an amount of change of refractive index, d represents cell intervals of the liquid crystal 7g. In addition, λ represents a wavelength of the light beam B output from the laser diode 2.

Next, the principle of wavefront aberration compensation in the liquid crystal panel 7 according to the embodiment having the above described constitution will be described.

Note that the wavefront aberration on the pupil plane of the objective lens 4 is W(r,φ), and (r,φ) represents polar coordinates on the pupil plane.

Normally, when the optical disk DK is inclined relative to the optical axis of the light beam B to produce the tilt angle, the wavefront aberration (primarily, coma aberration) $W_{tlt}$(r,φ) relative to the light beam B occurs, and thereby, the light beam B cannot be narrowed down by the objective lens 4.

The aberration constituting a major part of the wavefront aberration $W_{tlt}$(r,φ) is the wavefront aberration expressed by the following expression (2).

$$W_{tlt}(r,\phi) = \omega 31 \times r3 \times \cos\phi + \omega 11 \times r \times \cos\phi \quad \text{Expression (2)}$$

Where, ω31 and ω11 are constants given by the tilt angle of the optical disk DK, substrate thickness, substrate refractive index, and numerical aperture (NA) of the objective lens 4, and ω31 represents coma aberration and ω11 represents aberration by the movement of the image point.

On the other hand, assuming that the standard deviation of the wavefront aberration W(r,φ) on the pupil plane of the objective lens 4 is $W_{rms}$, the $W_{rms}$ is expressed by the following expression (3). Note that $W_0$ in the expression (3) is an average value of $w_{tlt}$(r,φ) on the pupil plane. The $W_{rms}$ is used for the evaluation of the wavefront aberration, and, by reducing $W_{rms}$, good reproduction with little effect of wavefront aberration can be performed. For this purpose, as clearly seen from the following expression (3), W(r,φ) may be made smaller in order to compensate wavefront aberration.

$$W_{rms} = \sqrt{\frac{\iint (W(r,\phi) - W_0^2) r\, dr\, d\phi}{\pi}} \quad \text{(Expression 3)}$$

Accordingly, in the embodiment, $W_{tlt}$(r,φ) that occurs due to inclination of the optical disk DK in its radial direction, for example, is compensated by controlling the voltages applied to the respective pattern electrodes, which will be described later, of the transparent electrode 7c by the liquid crystal driver 8 to change the refractive index of the regions of the liquid crystal 7g corresponding to the respective pattern electrodes by Δn.

That is, in the embodiment, the wavefront aberration is compensated by providing phase difference to the light beam B that passes through the regions corresponding to the respective pattern electrodes by the changes in the refractive indices.

Specifically, assuming that the phase difference given by the liquid crystal 7g is $W_{lc}$(r,φ), the wavefront aberration W(r,φ) on the pupil plane of the objective lens 4 when the liquid crystal panel 7 is disposed is expressed by the expression (4), and, as clearly seen from the expression (4), it is known that, in order to cancel out the wavefront aberration W(r,φ) caused by the tilt angle of the optical disk DK, the expression (5) may be used.

$$W(r,\phi) = W_{tlt}(r,\phi) + W_{lc}(r,\phi) \quad \text{Expression (4)}$$

$$W(r,\phi) = W_{tlt}(r,\phi) + W_{lc}(r,\phi) = 0 \quad \text{Expression (5)}$$

That is, as expressed by the following expression 6, the wavefront aberration $W_{lc}$(r,φ), which has a reverse polarity to the wavefront aberration $W_{tlt}$(r,φ) caused by the tilt angle of the optical disk DK, may be provided to the light beam B by the liquid crystal 7g.

$$W_{lc}(r,\phi) = -W_{tlt}(r,\phi) \quad \text{Expression (6)}$$

Further, in order to provide the wavefront aberration $W_{lc}$(r,φ) that has a reverse polarity to the wavefront aberration $W_{tlt}$(r,φ) caused by the tilt angle of the optical disk DK, pattern electrodes may be provided to the transparent electrode 7c so as to divide the liquid crystal 7g according to the wavefront aberration distribution caused by the tilt angle, and the applied voltages to the pattern electrodes may be controlled so as to provide wavefront aberration with reverse polarity to the wavefront aberration caused by the tilt angle.

Here, an example of the wavefront aberration distribution will be described using FIGS. 3 to 5.

Figure 3:
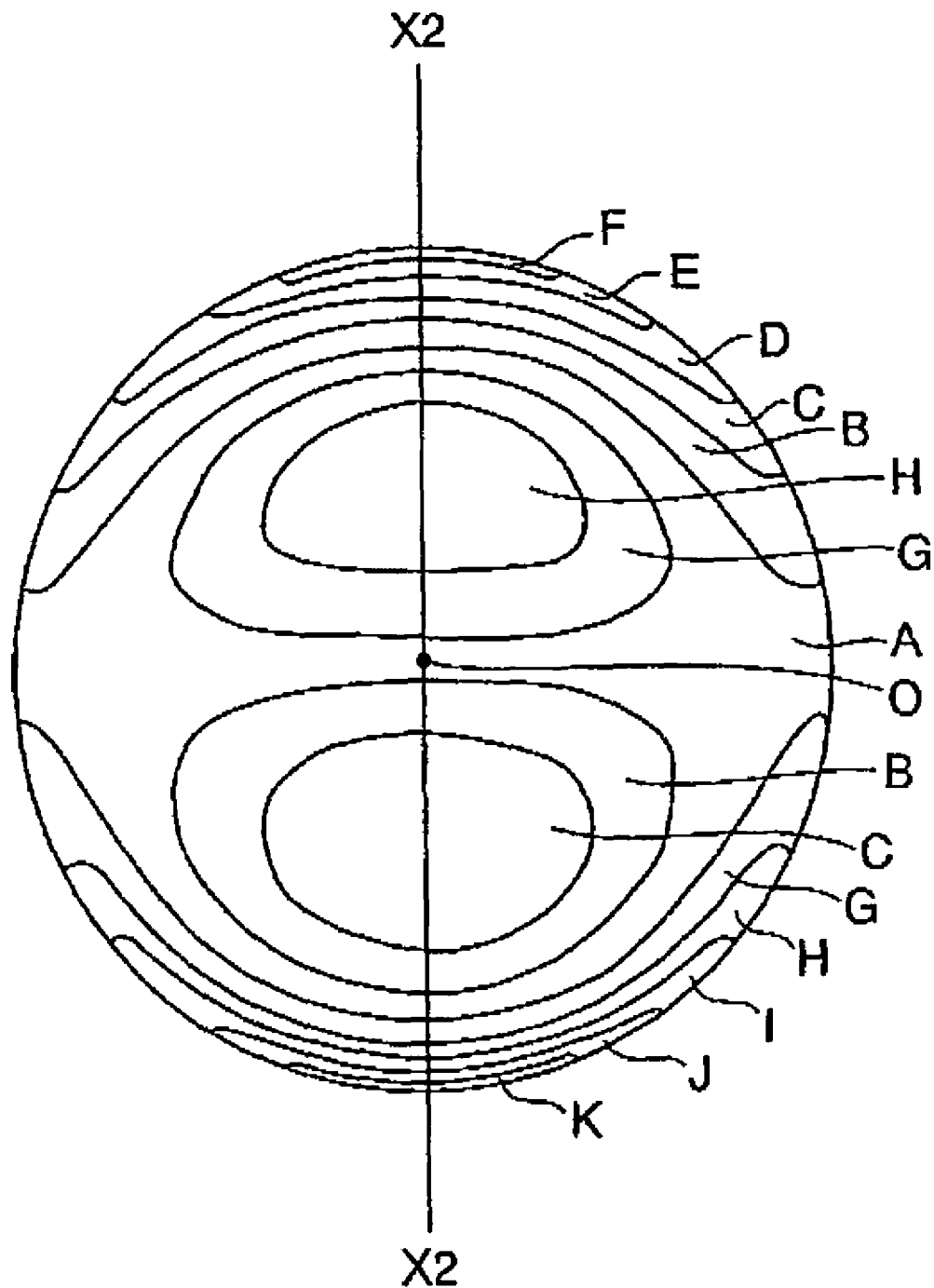
FIG. 3 shows an example of wavefront aberration distribution that occurs on the pupil plane of the objective lens 4.
Figure 4:
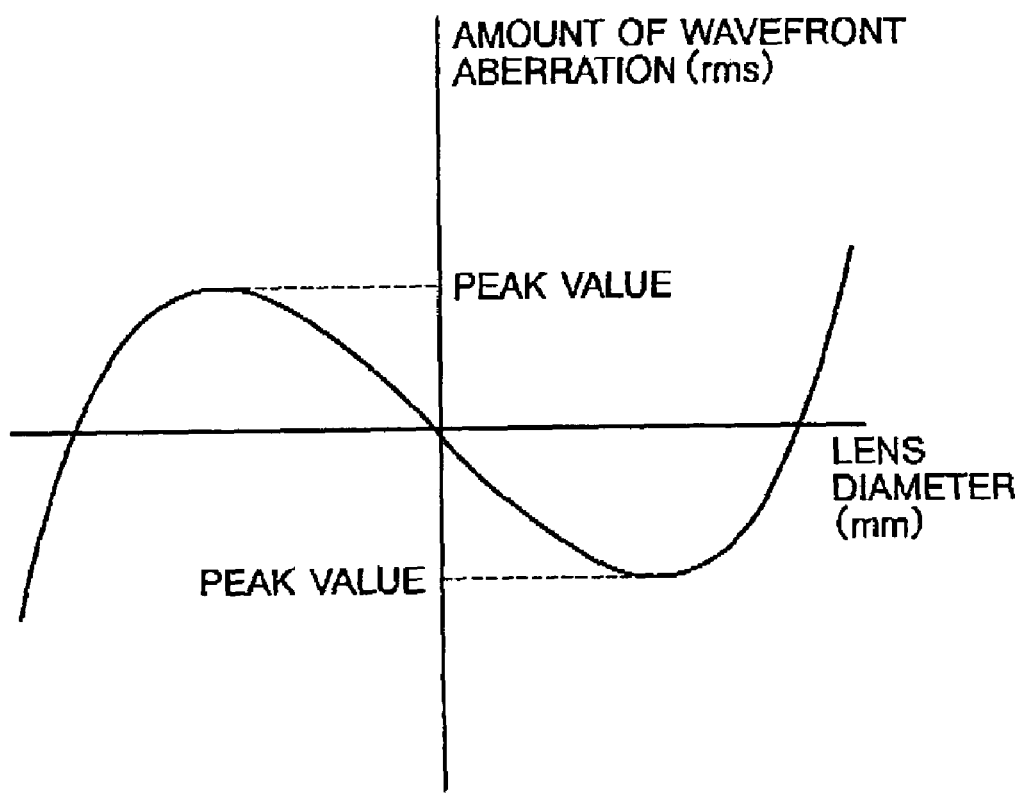
FIG. 4 shows an example of distribution characteristics of wavefront aberration.
Figure 5:
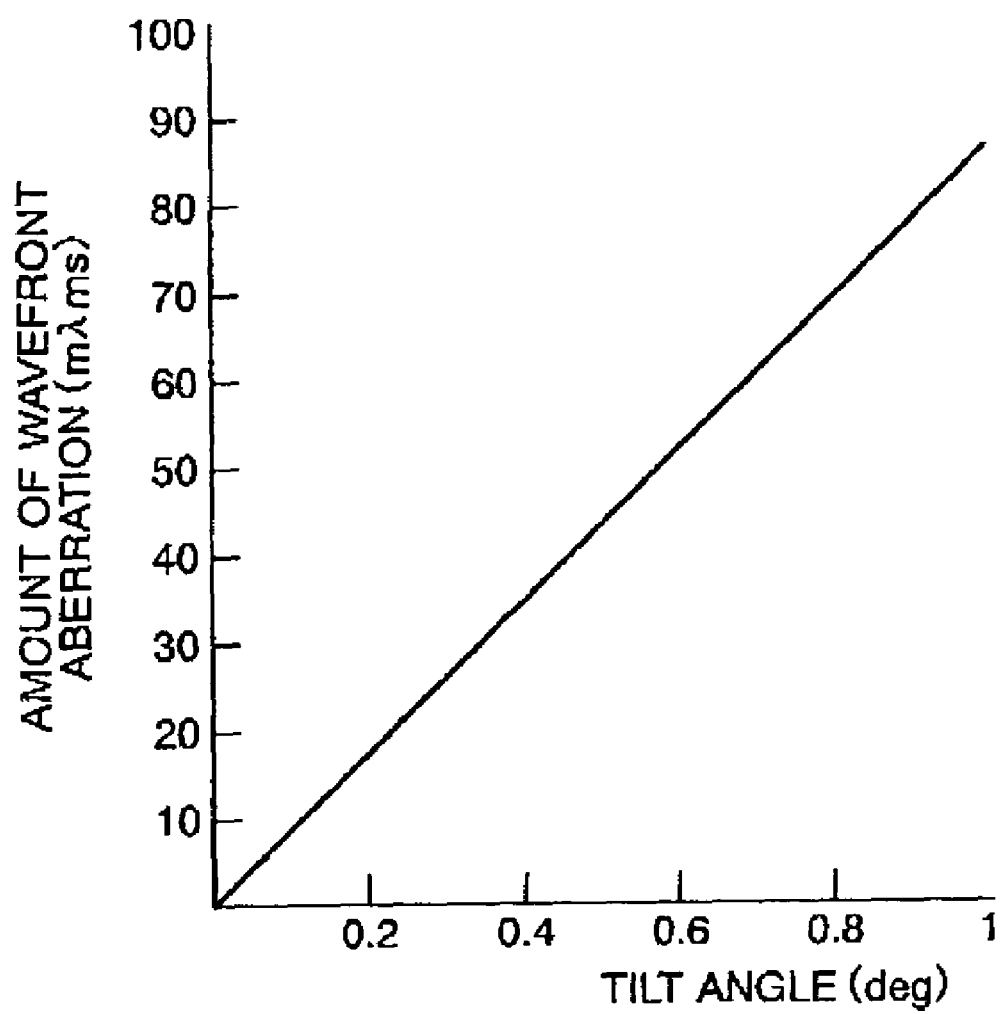
FIG. 5 shows the relationship between the magnitude of the tilt angle and the amount of wavefront aberration.

Note that FIG. 3 shows an example of the wavefront aberration distribution that occurs on the pupil plane of the objective lens 4 caused by the inclination of the optical axis, and FIG. 4 shows an example of distribution characteristics of wavefront aberration. Further, FIG. 5 shows the relationship between the magnitude of the tilt angle and the amount of wavefront aberration.

The wavefront aberration distribution shown in FIG. 3 is an example of calculation result of the wavefront aberration distribution on the pupil plane of the objective lens 4 using the above described expression (2). Specifically, FIG. 3 shows the wavefront aberration distribution at the best image point O of luminous flux in the case where the information recording surface of the optical disk DK is inclined by +1°. The wavefront aberration distribution is shown by the regions A to K having ranges where the values of the wavefront aberration are constant.

In addition, the wavefront aberration distribution shown in FIG. 3 is contrastive distribution in which the regions B and G, the regions C and H, the regions D and I, the regions E and J, and the regions F and K show reverse polarity relative to each other with the region A as a center.

In the case where the tilt angle is produced in the radial direction of the optical disk DK, the X2-X2 axis in FIG. 3 shows the radial direction of the optical disk DK.

On the other hand, in the case where the tilt angle is produced in the tangential direction of the optical disk DK, the X2-X2 axis in FIG. 3 shows the tangential direction of the optical disk DK. Note that the distribution characteristic of the wavefront aberration on the X2-X2 axis is shown in FIG. 4.

The distribution of the wavefront aberration shown in FIG. 3 itself is constant regardless of the magnitude of the tilt angle. On the other hand, the amount of wavefront aberration varies according to the magnitude of the tilt angle. That is, the peak value of the curve shown in FIG. 4 becomes higher as the tilt angle becomes larger, and becomes lower as the tilt angle becomes smaller. On this account, as shown in FIG. 5, as the magnitude of the tilt angle becomes larger, the amount of wavefront aberration to be compensated increases.

Therefore, produced wavefront aberration can be compensated if the phase difference having a reverse polarity to the wavefront aberration is provided by providing pattern electrodes based on the distribution of wavefront aberration, and controlling the voltages applied to the respective pattern electrodes in response to the magnitude of the tilt angle.

Next, the arrangement of the pattern electrodes in the transparent electrode 7c of the liquid crystal panel 7 according to the embodiment will be described using FIGS. 6 and 7. Here, to make the feature of the transparent electrode 7$c$ of the embodiment clearer, the arrangement will be described based on the comparison with the related art.

Figure 6:
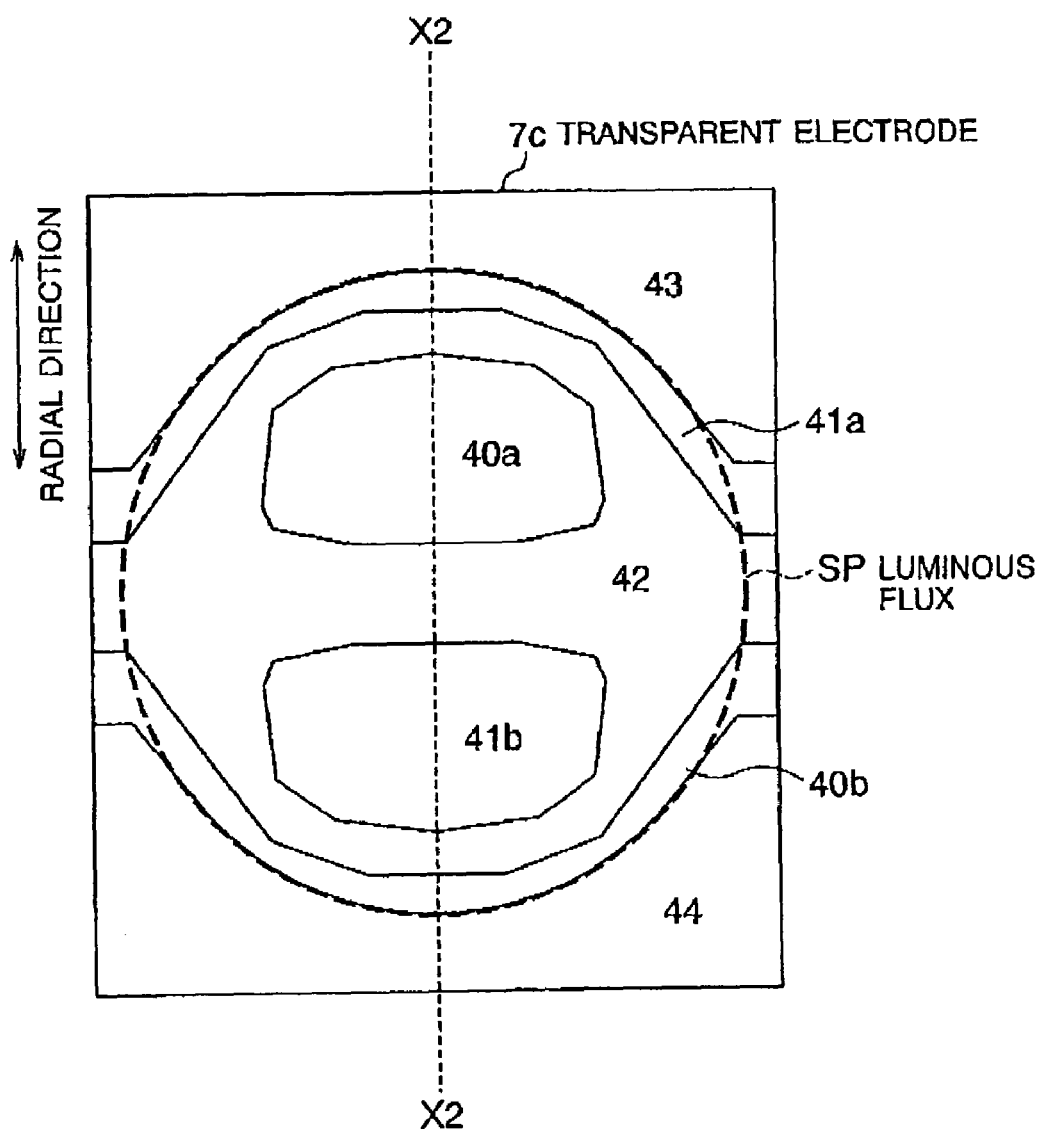
FIG. 6 is a plan view showing an example of the constitution of the transparent electrode 7c of the liquid crystal panel 7 according to the embodiment.
Figure 7:
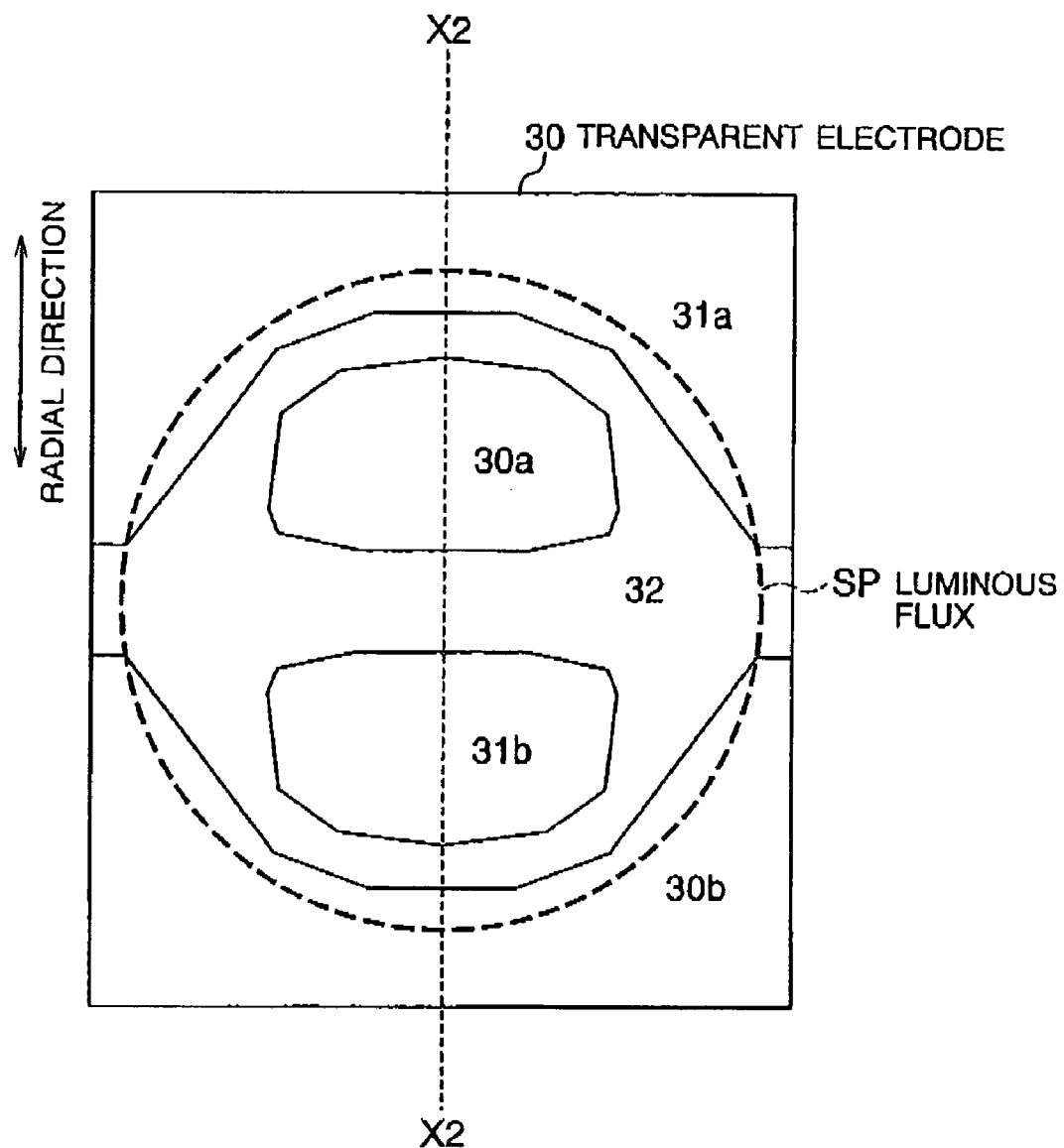
FIG. 7 is a plan view showing the constitution of the conventional transparent electrode.

Note that, FIG. 6 is a plan view showing an example of the constitution of the transparent electrode 7$c$ according to the embodiment, and FIG. 7 shows the constitution of the conventional transparent electrode.

The transparent electrode 7$c$ in the embodiment is divided into pattern electrodes 40$a$, 40$b$, 41$a$, 41$b$, and 42, 43 and 44 insulated from each other and constituted by the total seven pattern electrodes as shown in FIG. 7.

In addition, for example, the pattern electrodes 40$a$, 40$b$, 41$a$, 41$b$, 42, 43, and 44 constitute partial electrodes of the invention. Further, for example, the pattern electrodes 40$a$, 40$b$, 41$a$, 41$b$, and 42 constitute a first partial electrode portion of the invention, and the pattern electrodes 43 and 44 constitute a second partial electrode portion of the invention.

The respective pattern electrodes of the transparent electrode 7$c$ are arranged so that the range of luminous flux SP may be in the position and in size as shown in FIG. 7, in the case where the position of the central axis of the objective lens 4 and the position of the central axis of the liquid crystal panel 7 are aligned with each other. Note that "the range of luminous flux SP" indicates a range in which the light beam B is limited by the aperture of the objective lens.

In addition, for the measure against misalignment, which will be described later, the boundary between the pattern electrodes 41$a$ and 43 and the boundary between the pattern electrodes 40$b$ and 44 are set so as to conform to the outer periphery of the luminous flux SP, respectively.

Further, in order to make forms of the respective pattern electrodes into substantially the same forms corresponding to the distribution of the above described wavefront aberration generated in the radial direction, the pattern electrodes 40$a$ and 41$b$, the pattern electrodes 41$a$ and 40$b$, and the pattern electrodes 43 and 44 are disposed line symmetrically with an axis of symmetry passing through the center of the transparent electrode 7$c$ and perpendicular to the radial direction (X2-X2 axis direction) as a center. In addition, the values of phase difference provided by the pattern electrodes 40$a$ and 41$b$ to the light beam B have reverse polarities with each other. Similarly, the values of phase difference provided by the pattern electrodes 41$a$ and 40$b$ and the pattern electrodes 43 and 44 to the light beam B have reverse polarities with each other, respectively.

Normally, if the number of divided parts of transparent electrode is made larger for segmentation, wavefront aberration caused by the tilt angle of the optical disk DK can be completely cancelled out. However, the number of divided parts of transparent electrode is made larger by dividing it in a grid pattern, for example, drive signals are needed to be controlled and applied with respect to each of the segmented regions, and thereby, formation of the transparent electrode and formation of wiring such as lead lines become difficult.

Accordingly, in order to enable the transparent electrode 7$c$ of the embodiment to be formed easily and to compensate the wavefront aberration efficiently, within the range of the luminous flux SP (inside thereof), the divided form of the transparent electrode is made into a divided form substantially the same corresponding to the actual wavefront aberration distribution (wavefront aberration distribution in the pupil plane of the objective lens 4) shown in FIG. 3, as well as in the conventional transparent electrode 30.

Note that the transparent electrode 7$c$ in the embodiment and the conventional transparent electrode 30 shown in FIG. 7 have pattern electrodes having the same forms and sizes within the range of the luminous flux SP (inside thereof), respectively. More specifically, within the range of the luminous flux SP, the pattern electrodes 40$a$, 40$b$, 41$a$, 41$b$, and 42 of the transparent electrode 7$c$ of the embodiment shown in FIG. 6 correspond to the pattern electrodes 30$a$, 30$b$, 31$a$, 31$b$, and 32 of the conventional transparent electrode 30 shown in FIG. 7, respectively.

On the contrary, the form of the transparent electrode 7$c$ of the embodiment is different from the form of the conventional transparent electrode 30 outside of the range of the luminous flux SP.

Specifically, the transparent electrode 7$c$ of the embodiment shown in FIG. 6 is divided into pattern electrodes 43 and 44.

As described above, in the embodiment, in the case where misalignment within the plane perpendicular to the optical axis of the light beam B (hereinafter, referred to as "misalignment") occurs in the radial direction between the position of the central axis of the objective lens 4 and the position of the central axis of the liquid crystal panel 7, the wavefront aberration when misalignment occurs is compensated by the action of either pattern electrode 43 or 44 more effectively compared to the conventional one by providing the pattern electrodes 43 and 44 outside of the range of the luminous flux SP.

Note that the misalignment occurs due to lowering of alignment accuracy in the manufacturing process of the optical pickup PU, or disk eccentricity of the optical disk DK.

Next, wavefront aberration compensation using the transparent electrode 7$c$ of the embodiment will be described referring to FIGS. 8 and 9.

Figure 8:
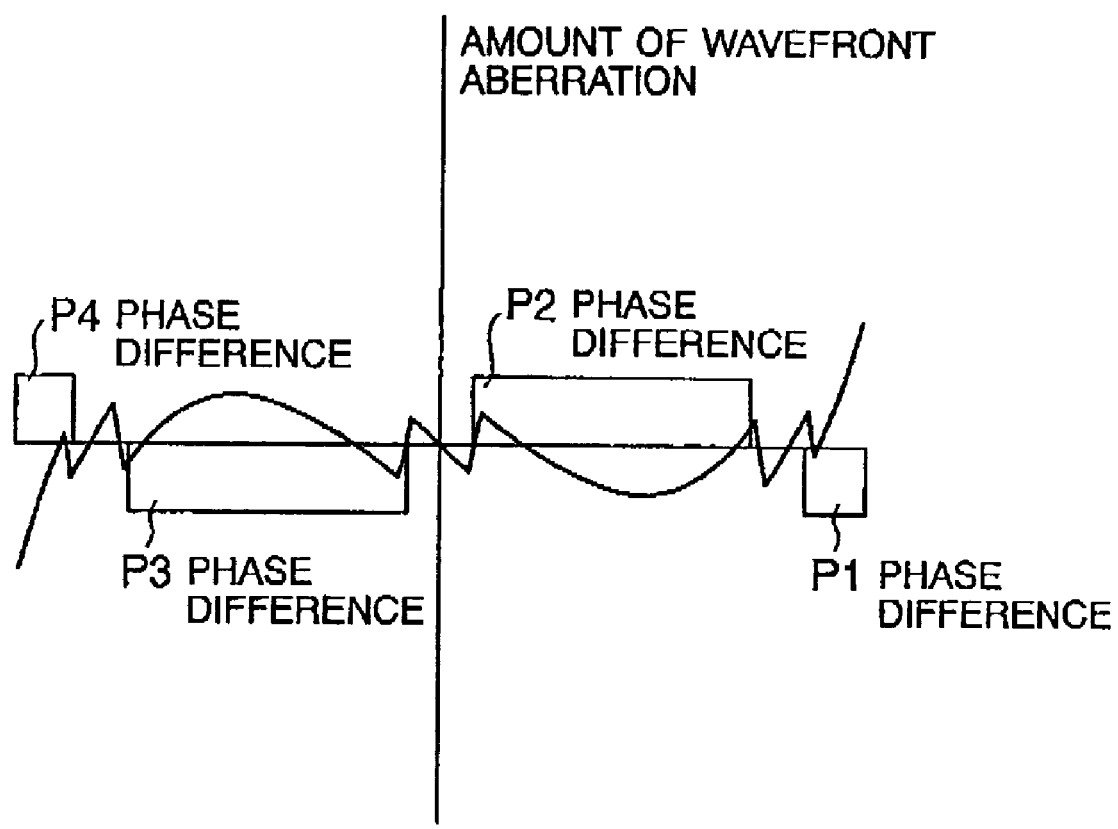
FIG. 8 shows wavefront aberration distribution after aberration compensation.
Figure 9:
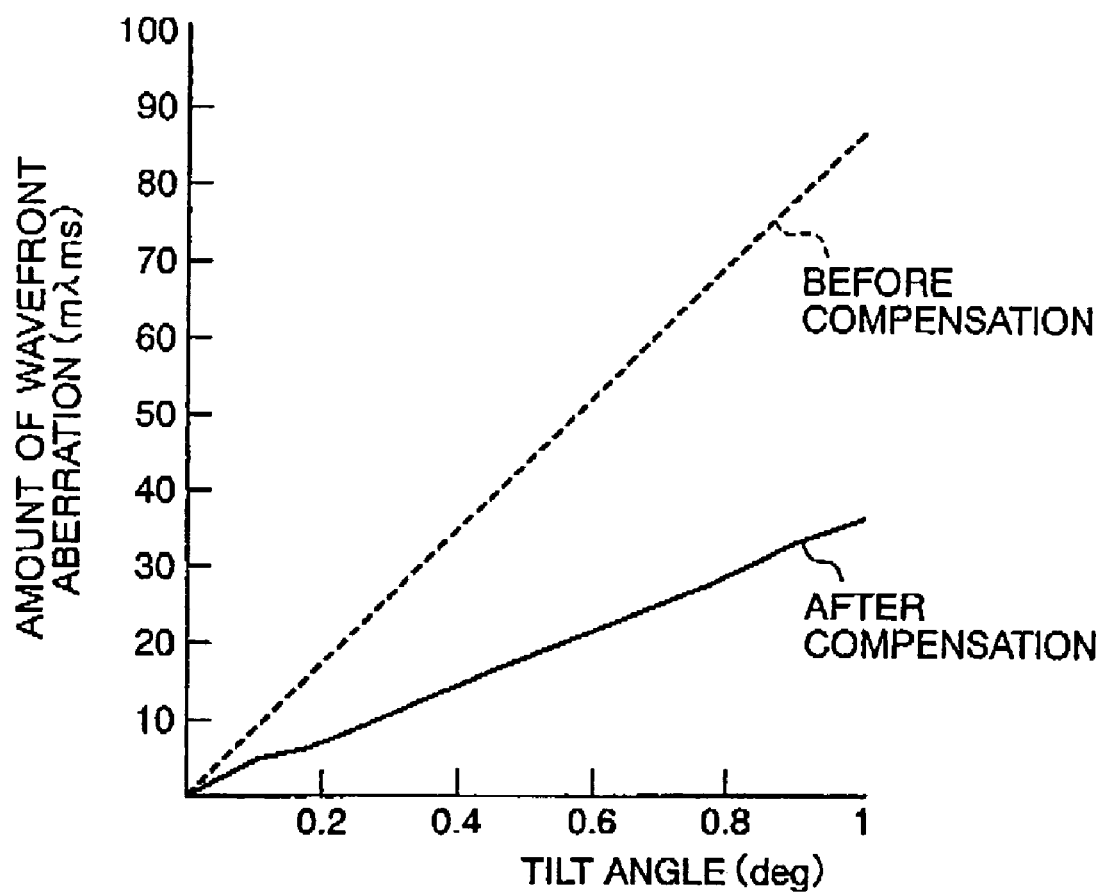
FIG. 9 shows the relationship between the change of the tilt angle and the aberration compensation.

Note that FIG. 8 shows an example of wavefront aberration distribution after aberration compensation, and FIG. 9 shows an example of the relationship between the change of the tilt angle and the aberration compensation.

As below, the case where only the wavefront aberration produced in the radial direction of the optical disk DK is compensated will be described. That is, the case where the tilt angle in the tangential direction is zero degrees and only the tilt angle in the radial direction exists in the optical disk DK will be described.

In addition, for convenience of description, here, the liquid crystal molecules M are oriented in advance so that the phase difference of the light beam B transmitted through the region of the liquid crystal g corresponding to the pattern electrode 42 may be "zero" when the voltage applied to the pattern electrode 42 is "zero". Further, the transparent electrode 10$d$ is grounded, and the liquid crystal panel 7 is disposed in advance so that the X2-X2 axis in FIG. 6 may be along the radial direction of the optical disk DK.

First, wavefront aberration compensation in the case where the position of the central axis of the objective lens 4 and the position of the central axis of the liquid crystal panel 7 are aligned with each other will be described later.

Note that the liquid crystal driver 8 is arranged so as to be supplied with information on the tilt angle in the radial direction of the optical disk DK detected by the CPU when the reproduction of information recorded in the optical disk DK is started.

The liquid crystal driver 8 is arranged so as to calculate the voltage values to be applied to the respective pattern electrodes to provide wavefront aberration having a reverse polarity to the produced wavefront aberration distribution according to the magnitude of the tilt angle in the radial direction supplied from the CPU 9, and apply the voltages to the respective pattern electrodes based on the calculated result.

Specifically, the liquid crystal driver 8 is arranged so as to apply the voltage Vc that indicates the reference voltage with which light beam B is allowed to be transmitted without being provided with phase difference, apply the voltage V1 to the pattern electrodes 40a and 40b of the transparent electrode 7c, and apply the voltage V2 to the pattern electrode 44.

In addition, the liquid crystal driver 8 is arranged to apply the voltage V3 to the pattern electrodes 41a and 41b, and apply the voltage V4 to the pattern electrodes 43, respectively.

For example, in the embodiment, the voltage value of the voltage Vc as the reference voltage is "zero" because the liquid crystal molecules M are oriented in advance so that the phase difference of the light beam B transmitted through the pattern electrode 42 may be "zero".

In addition, since the provided amounts of phase difference by the voltages V1 and V3 have the same magnitude but reverse polarity to each other in the regions corresponding to the pattern electrodes 40a and 41b and the pattern electrodes 41a and 40b, the liquid crystal driver 8 is arranged so as to calculate the respective voltage values so that the voltages V1 and V3 may have the relationship of (Expression 7), and apply the calculated respective voltage values to the respective pattern electrodes.

$$V1=-V3 \qquad \text{((Expression 7)}$$

Note that, in the embodiment, as shown in FIG. 6, since the light beam B does not pass through the region of the liquid crystal g corresponding to the pattern electrodes 43 and 44, the change in the orientation direction of the liquid crystal molecules M of the liquid crystal q corresponding to the pattern electrodes 43 and 44 does not exert any influence on the light beam B. That is, since the voltages V2 and V4 applied to the pattern electrodes 43 and 44 are not problematic to the wavefront aberration compensation in the case where position of the central axis of the objective lens 4 and the position of the central axis of the liquid crystal panel 7 are aligned with each other, examples of these voltages V2 and V4 are omitted here.

As described above, in the embodiment, the liquid crystal driver 8 is arranged so as to calculate the respective voltages V1, V2, V3, and V4 and apply them to the respective pattern electrodes. Since orientation direction of the liquid crystal molecules M of the liquid crystal g in the regions corresponding to the respective pattern electrodes can be changed by the voltages applied to the respective pattern electrodes by the liquid crystal driver 8, predetermined phase difference can be provided to the light beam B.

In addition, in the embodiment, since the range of luminous flux SP through which the light beam B passes is in the position and the size shown in FIG. 6 as described above, predetermined phase differences corresponding to the respective voltage values can be provided to the light beam B passing within the range of luminous flux SP in the regions of the liquid crystal g corresponding to the pattern electrodes 40a, 40b, 41a, 41b, and 42.

Accordingly, in the transparent electrode 7c in the embodiment, by providing phase differences according to the wavefront aberration distribution, respectively, as shown in FIG. 8, the wavefront aberration that occurs on the pupil plane of the objective lens 4 caused by the tilt angle in the radial direction of the optical disk DK can be compensated effectively.

That is, the curve in FIG. 8 shows the wavefront aberration (residual wavefront aberration) distribution, and this wavefront aberration occurs inevitably because the divided form of the transparent electrode is not conformed to the actual wavefront aberration distribution on the pupil plane of the objective lens 4 shown in FIG. 3 as described above.

In addition, phase differences P1 to P4 in FIG. 8 represent phase differences to be provided by the liquid crystal panel 7 using the conventional transparent electrode 30 and the transparent electrode 7c of the embodiment.

Further, in FIG. 8, the phase difference P1 is the phase difference provided in the region corresponding to the pattern electrode 40b, the phase difference P2 is the phase difference provided in the region corresponding to the pattern electrode 41b, the phase difference P3 is the phase difference provided in the region corresponding to the pattern electrode 40a, and the phase difference P4 is the phase difference provided in the region corresponding to the pattern electrode 41a.

As a result, in light of the above described amounts of wavefront aberration $W_{rms}$, as shown in FIG. 9, in the case where there is no misalignment, it is seen that the amount of wavefront aberration is reduced effectively compared to the case where compensation is not performed, by performing compensation in response to the change of the tilt angle in the radial direction of the optical disk DK.

Note that in the embodiment, since the forms of the pattern electrodes within the luminous flux SP are the same between the transparent electrode 30 shown in FIG. 7 and the transparent electrode 7c of the embodiment shown in FIG. 6, the effect of the wavefront aberration compensation using the conventional transparent electrode 30 and the effect of wavefront aberration shown in FIGS. 8 and 9 become the same in the case where the position of the central axis of the objective lens 4 and the position of the central axis of the liquid crystal panel 7 are aligned with each other.

That is, in the embodiment, in the case where the position of the central axis of the objective lens 4 and the position of the central axis of the liquid crystal panel 7 are aligned with each other, since the pattern electrodes 43 and 44 of the transparent electrode 7c of the embodiment are outside of the range of the luminous flux SP of the light beam B, they do not provide any action on the light beam B. Thereby, in the wavefront aberration compensation by the transparent electrode 7c, the effect obtained in the conventional transparent electrode 30 that performs the optimum wavefront aberration compensation when no misalignment occurs never ruined.

Here, in FIG. 9, the dot line represents the amount of wavefront aberration before wavefront aberration compensation, and the solid line represents the amount of wavefront aberration in the case where wavefront aberration compensation has been performed.

Subsequently, wavefront aberration compensation in the case where the position of the central axis of the objective lens 4 and the position of the central axis of the liquid crystal panel 7 are not aligned with each other and misalignment within the plane perpendicular to the optical axis of the light beam B occurs in the radial direction will be described using FIGS. 10 to 14.

Figure 10:
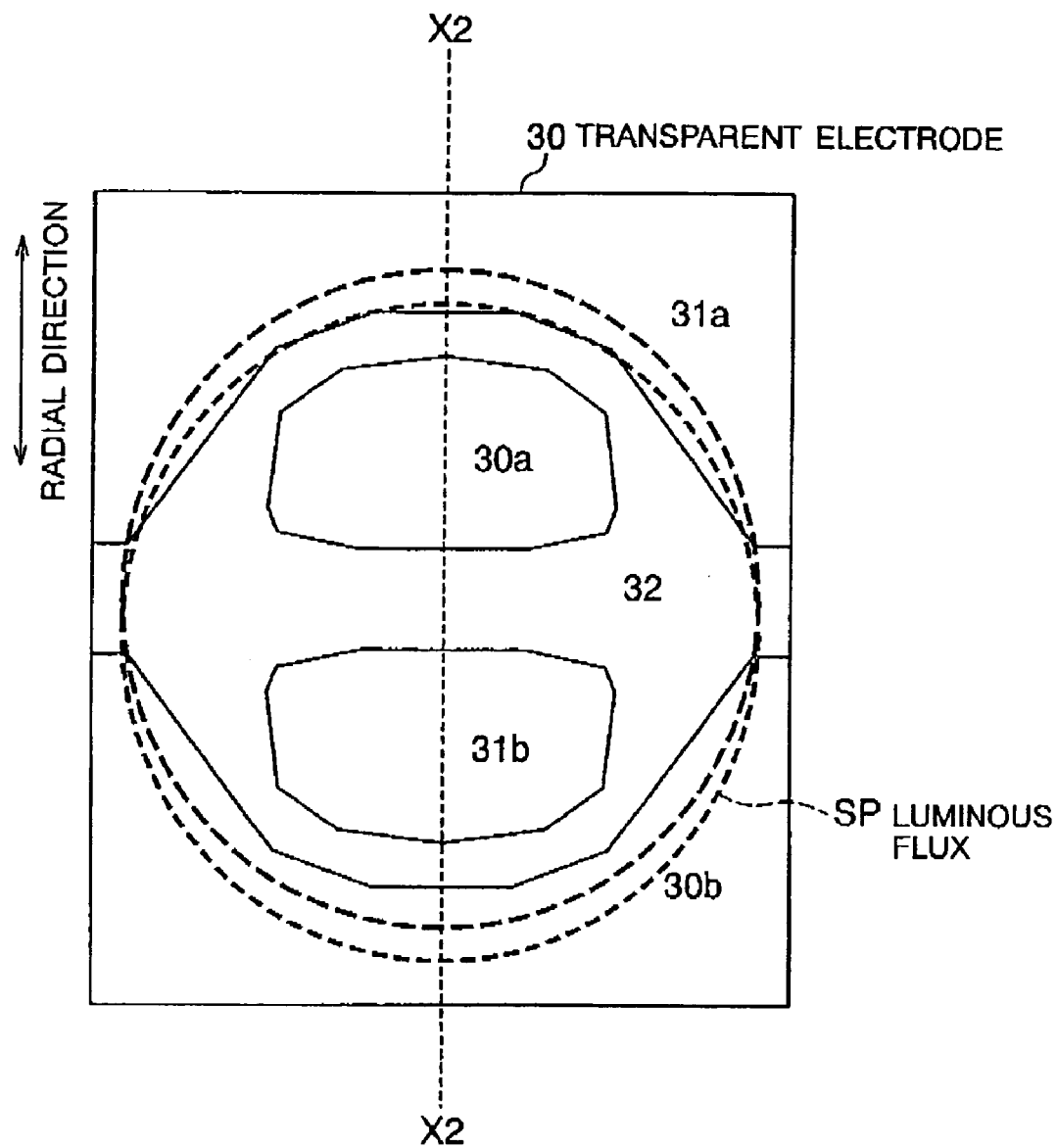
FIG. 10 is a plan view showing the range of the luminous flux SP when misalignment occurs in the radial direction in the conventional transparent electrode.
Figure 11:
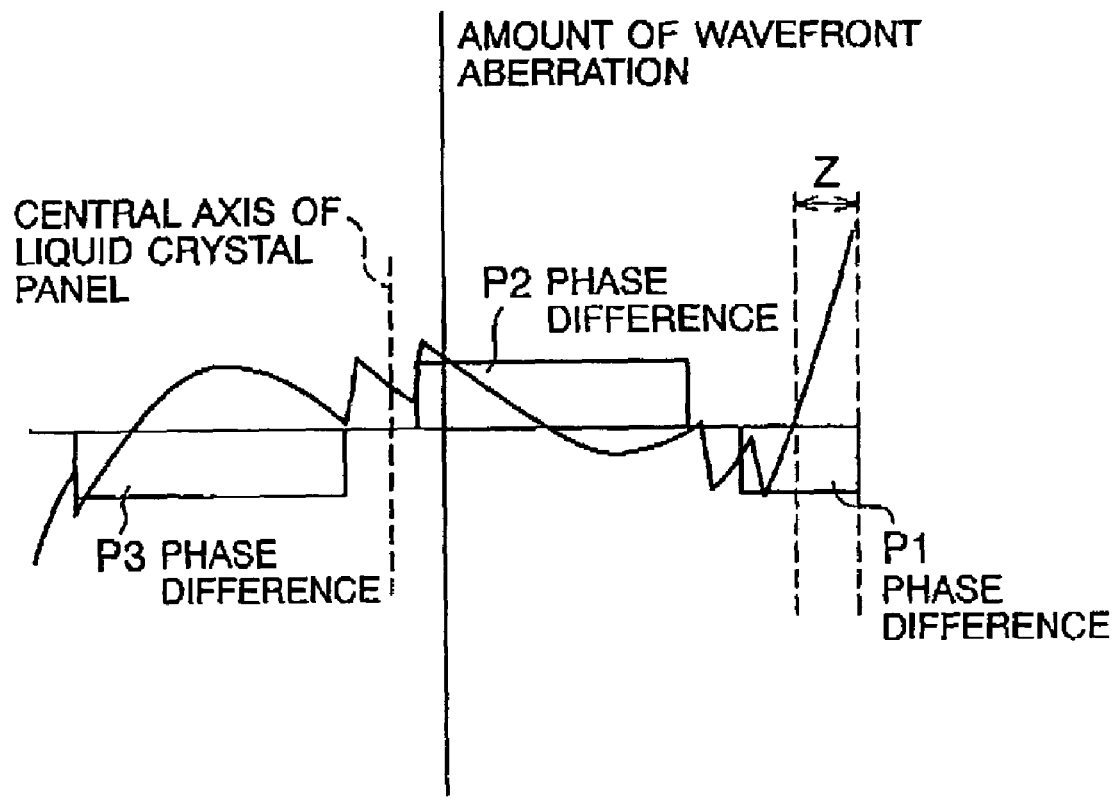
FIG. 11 shows the relationship between the misalignment in the radial direction in the conventional transparent electrode and the residual wavefront aberration.
Figure 12:
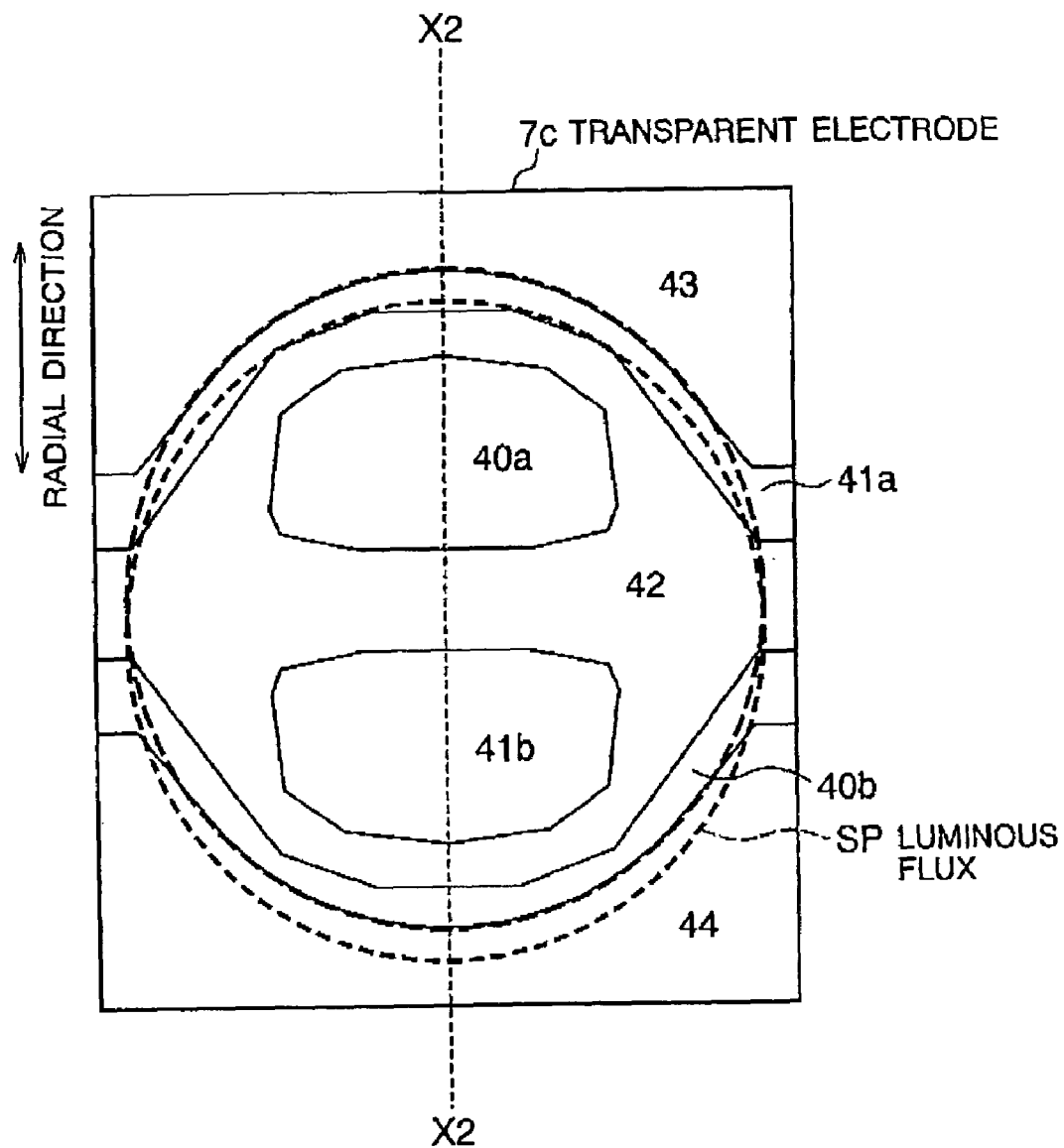
FIG. 12 is a plan view showing the range of the luminous flux SP when misalignment occurs in the radial direction in the transparent electrode 7c of the embodiment.
Figure 13:
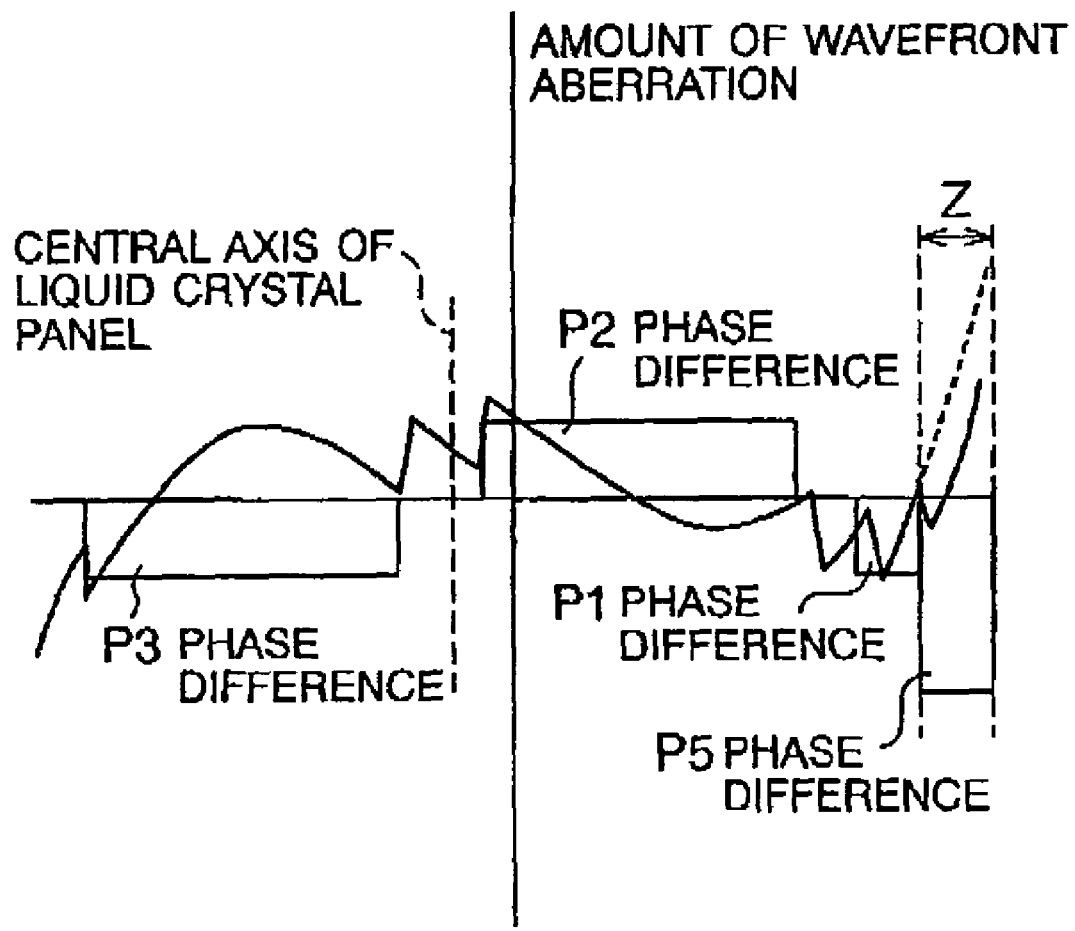
FIG. 13 shows the relationship between the misalignment in the radial direction in the transparent electrode 7c of the embodiment and the residual wavefront aberration.
Figure 14:
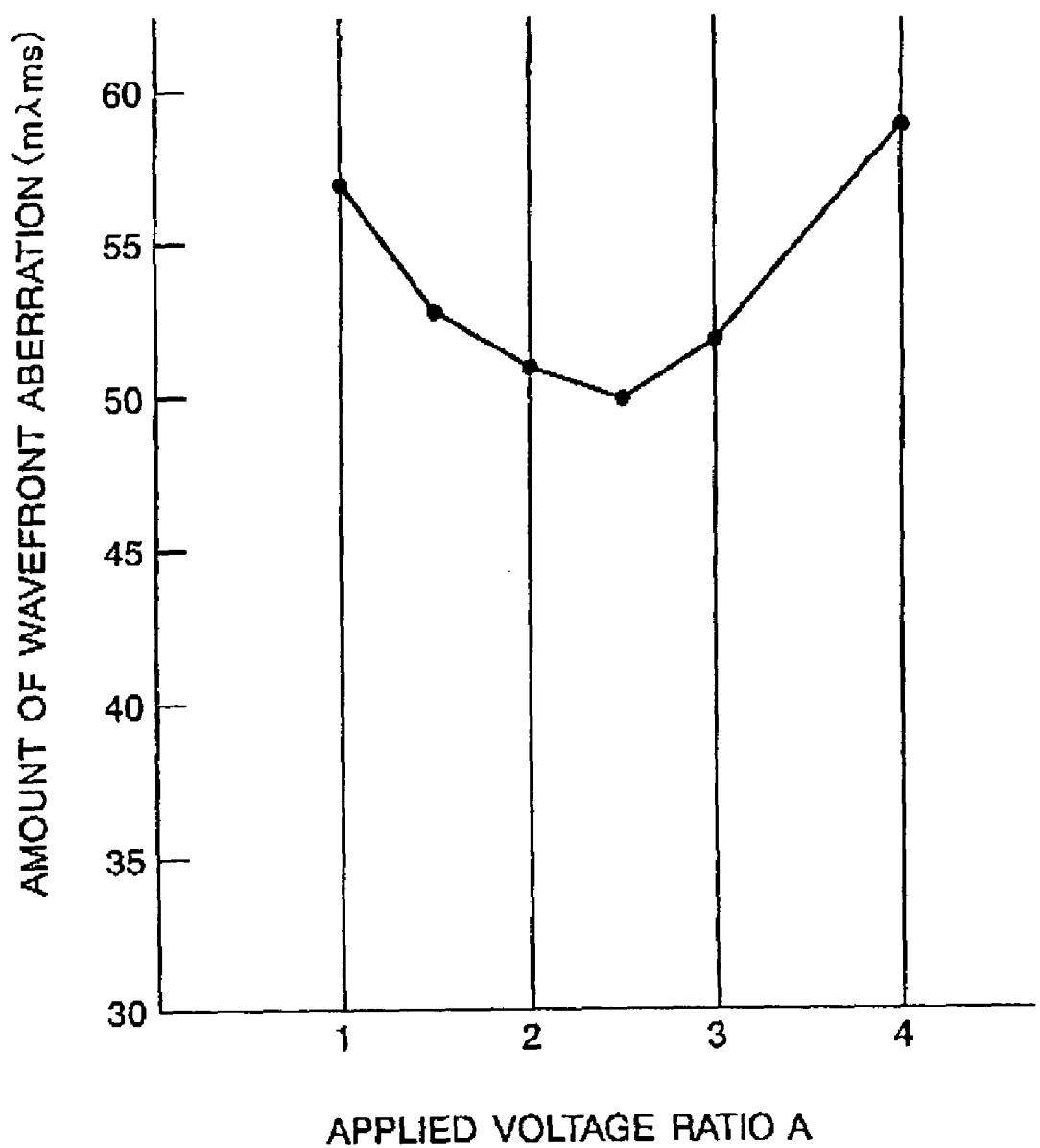
FIG. 14 shows the result obtained experimentally regarding an example of the amount or residual wavefront aberration in the radial direction due to difference of applied voltages in the case where constant misalignment occurs.
Figure 15:
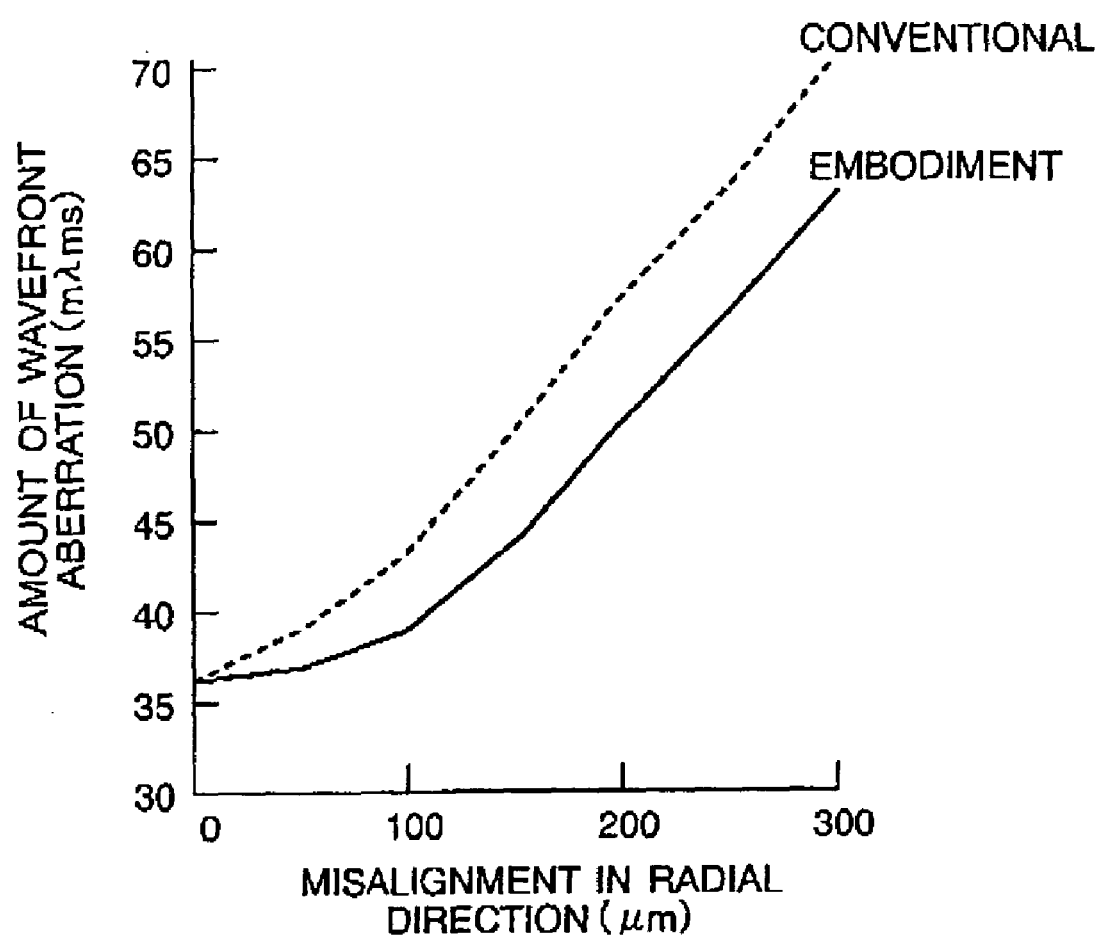
FIG. 15 shows the relationship between the misalignment and the amount of the residual wavefront aberration.

Note that FIG. 10 shows the range of the luminous flux SP when misalignment occurs in the radial direction in the conventional transparent electrode 30, and FIG. 11 shows the relationship between the misalignment in the radial direction and the residual wavefront aberration in the conventional transparent electrode 30. In addition, FIG. 12 shows the range of the luminous flux SP when misalignment occurs in the radial direction in the transparent electrode 7c of the embodiment, and FIG. 13 shows the relationship between the misalignment in the radial direction and the residual wavefront aberration in the transparent electrode 7c of the embodiment. Further, FIG. 14 shows the result obtained experimentally regarding an example of the amount of residual wavefront aberration in the radial direction due to difference of applied voltages in the case where constant misalignment occurs, and FIG. 15 shows the relationship between the misalignment and the amount of the residual wavefront aberration.

In the conventional transparent electrode 30, in the case where the above described misalignment occurs, deviation is produced between the range of the luminous flux SP through which the light beam B passes and the forms of the pattern electrodes as shown in FIG. 10, and thereby, a part that can not accommodate wavefront aberration compensation is produced.

Specifically, since the pattern electrode 30b is deviated from the range where compensation should be performed originally, a huge amount of wavefront aberration occurs in the region shown by z in FIG. 11. The reason is that the amount of wavefront aberration that occurs in the region shown by z is larger compared to the phase difference P1 provided by the pattern electrode 30b, and the wavefront aberration can not be fully compensated effectively.

As described above, since the transparent electrode 30 in the conventional liquid crystal panel has only the forms of pattern electrodes that accommodate the wavefront aberration in the case where there is no misalignment, when alignment occurs, the wavefront aberration compensation has not performed enough as a liquid crystal panel.

On the other hand, in the case where misalignment in the radial direction occurs toward the direction shown in FIG. 12, the transparent electrode 7c in the liquid crystal panel 7 of the embodiment operates so that the pattern electrode 44 may fall within the range of luminous flux SP and wavefront aberration compensation may also be performed effectively on the part that can not be compensated in the conventional example. Specifically, by the voltage V2 being applied to the pattern electrode 44, the electrode operates so as to provide wavefront aberration having a reverse polarity corresponding to the wavefront aberration in the part of the above described z when misalignment occurs.

Therefore, as shown in FIG. 13, according to the transparent electrode 7c of the embodiment, in the part that can not be compensated conventionally, the amount of occurrence of residual wavefront aberration can be suppressed effectively by providing the phase difference P5 in the region of liquid crystal 7g corresponding to the pattern electrode 44.

In addition, similarly, in the case where misalignment in the radial direction occurs toward a reverse direction to the direction shown in FIG. 12, the electrode operates so that the pattern electrode 43 may fall within the range of luminous flux SP and wavefront aberration compensation may also be performed effectively on the part that can not be compensated in the conventional example. In this case, by the voltage V4 being applied to the pattern electrode 43, the electrode operates so as to provide wavefront aberration having a reverse polarity to the wavefront aberration when misalignment occurs.

As described above, the liquid crystal panel 7 is arranged so that effective compensation may be performed on misalignment toward both directions in the radial direction because the pattern electrodes 43 and 44 are disposed line symmetrically with the axis of symmetry passing through the center of the transparent electrode 7c and perpendicular to the radial direction as a center.

Here, an example of values of the voltages V2 and V4 suitable for the case where wavefront aberration is compensated when misalignment in the radial direction occurs will be described.

As described above, the amount of wavefront aberration to be compensated in the region z is larger than the phase difference P1. On this account, in order to compensate wavefront aberration effectively in the region z, the phase difference P5 having the same polarity as the phase difference P1 and magnitude larger than the phase difference P1 may be provided.

Normally, since the amount of wavefront aberration differs depending on the magnitude of the tilt angle, the phase difference provided to compensate the wavefront aberration differs depending on the magnitude of the tilt angle. Further, within the constant range where the orientation of the liquid crystal molecules M in the liquid crystal g changes from the horizontal direction to the vertical direction, phase differences provided in the respective regions of the liquid crystal g according to the applied voltages vary proportionally.

Therefore, for example, assuming that the ratio of the phase difference P5 to the phase difference P1 is A, the ratio of the voltage V2 applied for providing the phase difference P5 to the voltage V1 applied for providing the phase difference P1, that is, the applied voltage ratio can also be expressed by the constant ratio A.

Accordingly, the relationship between the voltages V1 and V2 can be expressed by the expression (8).

$$V2 = A \cdot V1 \qquad \text{Expression (8)}$$

Further, the relationship between the voltages V3 and V4 can also be expressed by the expression (9).

$$V4 = A \cdot V3 \qquad \text{Expression (9)}$$

The difference of the effect of wavefront aberration compensation depending on the value of the applied voltage ratio A will be described using FIG. 14.

In FIG. 14, the result obtained experimentally with respect to the amount of residual wavefront aberration in the radial direction due to the difference in the applied voltage when constant misalignment occurs is shown in graphical representation. From the experimental result, it is seen that the effect of wavefront aberration compensation when constant misalignment occurs differs depending on the value of the applied voltage ratio A.

In addition, when the applied voltage ratio A is changed from "1" to "4" for example, in the case where the value of A is set to "2.5", that is, the voltage V2 is set to 2.5 times the voltage V1, it is experimentally shown that the residual amount of wavefront aberration is reduced most compared to the case where wavefront aberration compensation is performed at other applied voltage ratios.

Note that the case where the applied voltage ratio A is "1" indicates that, for example, the voltage V1 applied to the pattern electrode 40b and the voltage V2 applied to the pattern electrode 44 are equal. Similarly, it is indicated that the voltage V3 applied to the pattern electrode 41a and the voltage V4 applied to the pattern electrode 43 are equal.

In other words, that state is equal to the state in which the pattern electrode 41b and the pattern electrode 44 are not separated and the pattern electrode 41a and the pattern electrode 43 are not separated, and corresponds to the divided state of the transparent electrode 30 in the above described conventional liquid crystal panel.

Therefore, in the embodiment, the liquid crystal driver 8 controls a predetermined applied voltage ratio as A>1, for example, the values of the respective voltages V1 to 4 so that the applied voltage ratio may become A=2.5, and applies them to the respective pattern electrodes. Thereby, the better wavefront aberration compensation can be performed compared to the related art even when alignment occurs.

Note that the effect of wavefront aberration compensation in the case where the respective voltages V1 to 4 are controlled at the applied voltage ratio A=2.5 and applied to the respective pattern electrodes is shown in FIG. 15.

As shown in FIG. 15, it is seen that, according to the liquid crystal panel 7 of the embodiment, regardless of the amount of misalignment in the radial direction, the amount of residual wavefront aberration is reduced more largely and the effect of wavefront aberration compensation is larger compared to the related art.

By the way, the liquid crystal panel 7 accommodating only the misalignment in the radial direction of the optical disk DK has been described, however, the construction of the liquid crystal panel 7 is not limited to that.

That is, in the actual optical disk DK, production of the tilt angle only in either of the radial direction or the tangential direction is rare, and, inmost cases, the tilt angles are produced in both the radial direction and the tangential direction. In the case, in the optical disk DK, wavefront aberration produced by synthesizing wavefront aberration of components in both the radial direction and the tangential direction occurs.

Further, it is conceivable that misalignment also occurs not only in the radial direction, but in the tangential direction. On this account, the liquid crystal panel 7 may accommodate misalignment in both the radial direction and the tangential direction.

In this case, for example, the transparent electrode 7c constitutes the first electrode portion on one surface of the invention, and the transparent electrode 7d constitutes the second electrode portion on the other surface of the invention.

Specifically, in addition to the construction of the transparent electrode 7c, the form of the transparent electrode 7d in the liquid crystal panel 7 is a form for accommodating alignment in the tangential direction. In the case where the tilt angle occurs in the tangential direction of the optical disk DK, since X2-X2 in FIG. 3 indicates the tangential direction in the optical disk DK, the form of the transparent electrode 7d may be divided into the same form as that the form of the transparent electrode 7c shown in FIG. 6 rotated by 90 degrees.

Thus, the transparent electrode 7d has the form corresponding to the wavefront aberration distribution that occurs due to the tilt angle within the tangential direction in the range of the luminous flux SP, and the form for accommodating the misalignment in the tangential direction outside the range of the luminous flux SP.

In this case, the liquid crystal driver 8 determines voltages with respect to each of the respective pattern electrodes included in the transparent electrodes 7c and 7d, respectively, based on the tilt angle detected in the CPU 9 and applies them.

Here, the phase difference to be provided to the light beam B in the liquid crystal 7g is the sum of the phase difference required for compensating wavefront aberration caused by the tilt angle in the radial direction and the phase difference required for compensating wavefront aberration caused by the tilt angle in the tangential direction. For the purpose, the liquid crystal driver 8 determines the voltages applied to the respective pattern electrodes of the transparent electrodes 7c and 7d so as to produce voltage differences that provide the phase difference corresponding to the sum of the above two kinds of phase differences to the liquid crystal 7g.

As a result, phase differences different with respect to each of the regions of the liquid crystal 7g partitioned by the respective pattern electrodes of the transparent electrodes 7c and 7d are provided to the light beam B, and thereby, wavefront aberration caused by the inclination of the optical axes in the two directions can be compensated simultaneously, and wavefront aberration compensation effective to misalignment in both the radial direction and the tangential direction can be performed.

As described above, the liquid crystal panel 7 of the embodiment is disposed on the optical path of the light beam B and compensates the wavefront aberration that occurs between the optical axis of the light beam B and the information recording surface in the optical disk DK by providing phase difference to the light beam B, and includes the first electrode portion constituted by the pattern electrodes 40a, 40b, 41a, 41b, and 42 for providing phase differences different with respect to each of the respective electrodes to the passing light beam B, and the second electrode portion disposed adjacent to the first electrode portion and constituted by the pattern electrodes 43 and 44 for providing phase differences different from those of the first electrode portion to the passing light beam B, and the pattern electrodes 43 and 44 are arranged by being characterized in that phase differences are provided to the light beam B passing through the respective electrodes in the case where misalignment within the plane perpendicular to the optical axis occurs between the position of the central axis of the objective lens 4 for condensing the light beam b on the information recording surface and the position of the central axis of the liquid crystal panel 7.

Therefore, in the case where the position of the central axis of the objective lens 4 for condensing the light beam B on the information recording surface and the position of the central axis of the liquid crystal panel 7 are aligned, the first electrode portion compensates wavefront aberration by providing phase difference to the optical beam B passing through the first electrode portion.

Further, in the case where misalignment within the plane perpendicular to the optical axis occurs between the position of the central axis of the objective lens 4 for condensing the light beam B on the information recording surface and the position of the central axis of the liquid crystal panel 7, the first electrode portion compensates wavefront aberration by providing phase difference to the optical beam passing through the first electrode portion of the optical beam B, and the pattern electrodes 43 or 44 compensates wavefront aberration by providing phase difference to the light beam B passing through the electrode of the optical beam B.

Thus, since the first electrode portion compensates wavefront aberration effectively when there is no misalignment, and, even when misalignment occurs, the second electrode portion compensates wavefront aberration of the light beam forced to pass through the second electrode portion by the misalignment, degradation of effect of wavefront aberration compensation caused by the misalignment never occurs and wavefront aberration after the misalignment occurs can be compensated effectively while suppressing cost rise.

Figure 16:
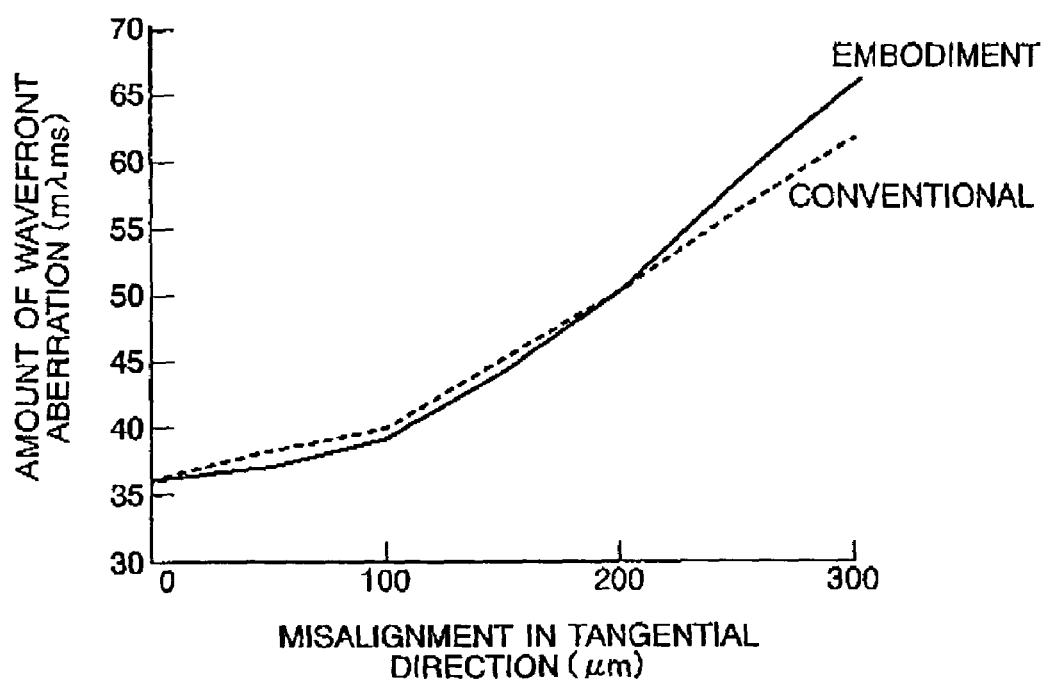
FIG. 16 shows the experimentally obtained result of the amount of the residual wavefront aberration in the case where misalignment in the tangential direction occurs.

Here, in the construction of the embodiment, even in the case where misalignment in the tangential direction occurs, the effect of the wavefront aberration compensation never be degraded compared to the conventional art as shown in FIG. 16.

As shown in FIG. 16, a large difference is not seen in the amount of residual wavefront aberration due to misalignment in the tangential direction between the conventional transparent electrode and the transparent electrode according to the embodiment. From the experimental result, in the case where misalignment in the tangential direction occurs, there hardly exists the influence on the wavefront aberration compensation by making the divided forms of the respective pattern electrodes of the transparent electrode 7c of the embodiment as forms for compensating misalignment in the radial direction effectively As a result, the compensation can be performed without the effect of the aberration compensation being degraded compared to the related art.

Note that FIG. 16 shows the experimentally obtained result of the amount of the residual wavefront aberration in the case where misalignment in the tangential direction occurs.

Further, the liquid crystal panel 7 of the embodiment is constructed by being characterized in that the respective first partial electrodes in the first electrode portion are constructed in forms corresponding to distribution of the wavefront aberration on a pupil plane of the objective lens 4.

Therefore, since the forms of the respective first partial electrodes are actually in forms corresponding to distribution of the wavefront aberration of the light beam B on the pupil plane of the objective lens 4, the wavefront aberration can be compensated more effectively.

Furthermore, the liquid crystal panel 7 of the embodiment is constructed by being characterized in that the second electrode portion has plural pattern electrodes 43 and 44, and the respective pattern electrodes are constructed in line symmetrical forms with an axis of symmetry perpendicular to a direction of the misalignment as a center.

Therefore, even in the case where the direction of the misalignment can not be previously identified, by accommodating at least two kinds of misalignment that occur in opposite directions to each other, degradation of the compensation result caused by the misalignment can be prevented, and the wavefront aberration after the misalignment occurs can be compensated effectively.

Moreover, the liquid crystal panel 7 of the embodiment is constructed by being characterized in that the respective pattern electrodes provide different phase differences at a predetermined constant ratio.

Thus, the phase differences provided with respect to each of the respective pattern electrodes are expressed by a constant ratio.

On this account, since the respective voltages applied to the pattern electrodes can be expressed by the constant ratio regardless of the change in the tilt angle, the voltage control performed in the liquid crystal driver 8 can be performed by more simple control without requiring complex control with respect to each of the pattern electrodes.

In addition, the liquid crystal panel 7 of the embodiment is constructed by being characterized in that the passing light beam is provided with phase difference in the case where the misalignment occurs between the optical axis in one of a radial direction and tangential direction and the information recording surface in the optical disk DK.

Therefore, wavefront aberration can be compensated effectively after the misalignment in the radial direction or the tangential direction occurs.

Further, the liquid crystal panel 7 can be constructed by being characterized in that the first electrode portion and second electrode portion are provided in the transparent electrodes 7c and 7d of the liquid crystal panel 7 through which the light beam B passes, the transparent electrode 7c compensates wavefront aberration caused by inclination in the radial direction and the transparent electrode 7d compensates wavefront aberration caused by inclination in the tangential direction.

In this case, wavefront aberration can be compensated effectively even when no misalignment occurs, and wavefront aberration after the misalignment occurs can be compensated effectively without degradation of wavefront aberration compensation effect caused by the misalignment both in the radial direction and the tangential direction.

Further, since the respective transparent electrodes of the liquid crystal panel 7 are constructed for compensating the wavefront aberration caused by the tilt angle in the radial direction and the tangential direction, respectively, only one electrode pattern is required to be used, and the divided pattern of the respective transparent electrodes can be made simple.

In addition, the optical pickup PU of the embodiment is constructed by being characterized by including the liquid crystal panel 7, the laser diode 2 for outputting the light beam B, the CPU 9 and the liquid crystal driver 8 for providing phase difference to the light beam B by applying voltages to the respective pattern electrodes, the objective lens 4 for condensing the light beam B passing through the liquid crystal panel on the optical disk DK, a light receiving device for receiving the light beam B condensed by the optical disk and reflected from the optical disk DK and outputting a light reception signal.

Therefore, even when the misalignment actually occurs between the position of the central axis of the objective lens 4 and the position of the central axis of the liquid crystal panel 7, there is no degradation of compensation effect caused by the misalignment, and the wavefront aberration can be compensated effectively regardless whether the misalignment occurs or not. For example, erroneous detection of the information on the optical disk DK by the wavefront aberration can be prevented.

Moreover, the information reproducing apparatus S of the embodiment is constructed by being characterized by including the above described optical pickup PU and the CPU 9 for, when information is recorded in the optical disk DK, reproducing the information based on the reception signal.

Figure 17:
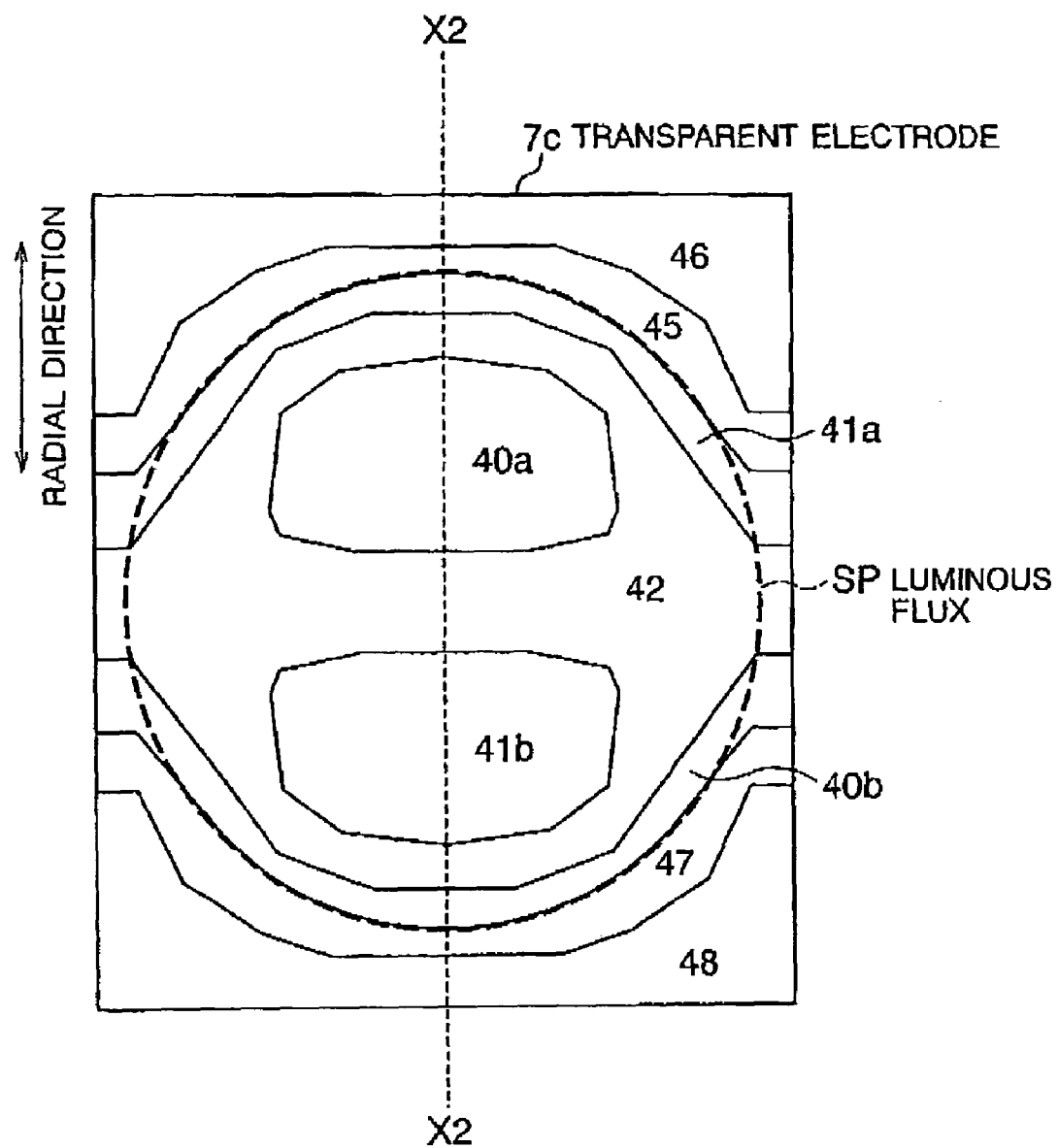
FIG. 17 shows another example of the construction of the transparent electrode 7c.

Therefore, when the misalignment occurs between the position of the central axis of the liquid crystal panel 7 and the position of the central axis of the objective lens 4, the wavefront aberration can be compensated to reproduce the information By the way, the pattern electrodes of the transparent electrode are constructed by dividing into seven parts in the liquid crystal panel 7 of the embodiment, however, the divided number of the pattern electrodes is not limited to that, and, for example, as shown in FIG. 17, the pattern electrodes can be further segmentized.

Here, FIG. 17 shows another example of the construction of the transparent electrode 7c.

As shown in FIG. 17, the pattern electrode 43 shown in FIG. 6 is constructed by dividing it into pattern electrodes 45 and 46 and the pattern electrode 44 shown in FIG. 6 is constructed by dividing it into pattern electrodes 47 and 48, and thereby, suitable phase differences are provided according to the degree of the misalignment and effective aberration compensation can be performed.

Figure 18:
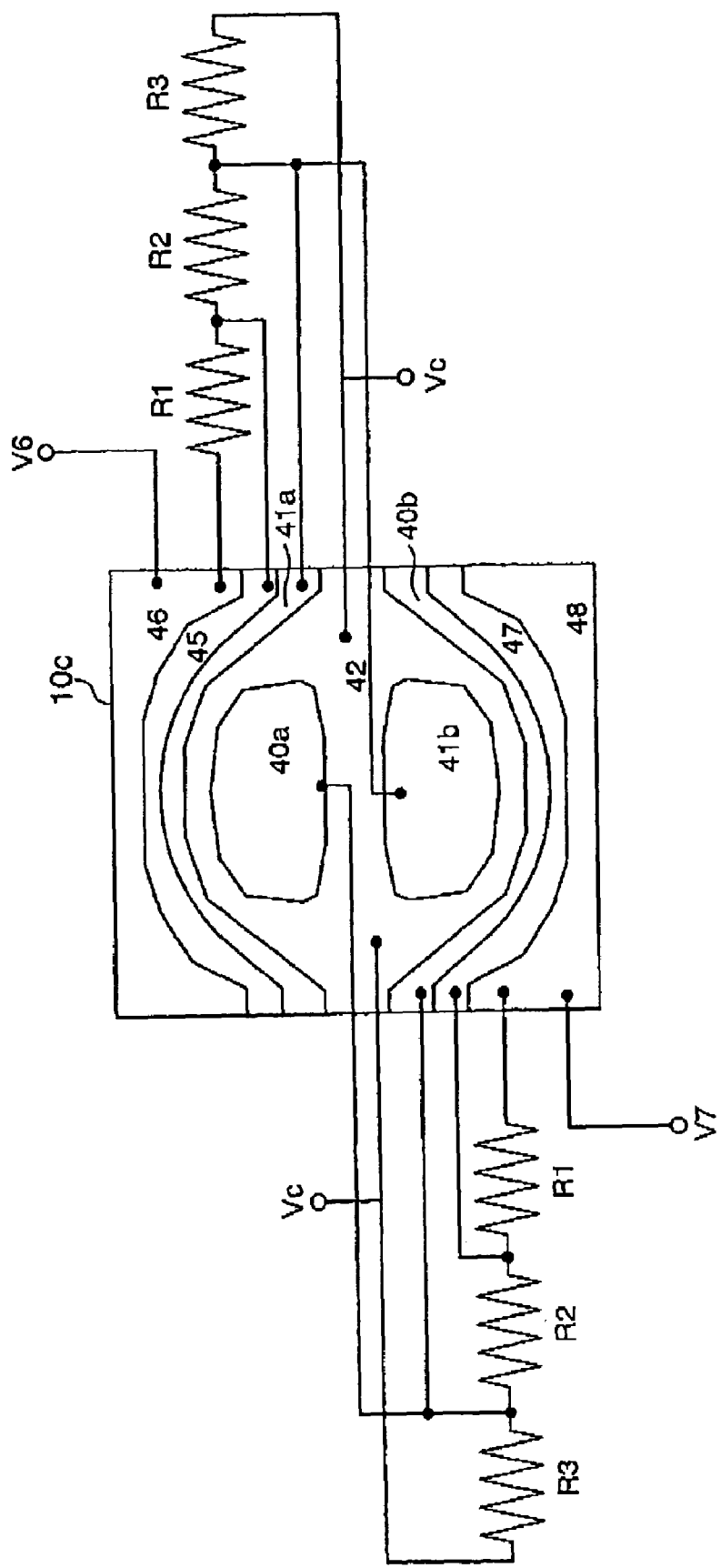
FIG. 18 shows an example in the case where resistance components are formed in the transparent electrodes, and the applied voltages are set using resistance partial pressure.

In this case, since control lines required for the control of the respective pattern electrodes are increased, it becomes effective that the applied voltages are set using resistance partial pressure as shown in FIG. 18.

Note that FIG. 18 shows an example in the case where the resistance components are formed in the transparent electrodes, and the applied voltages are set using resistance partial pressure.

As described above, voltages are applied to the respective pattern electrodes at a constant voltage ratio. On this account, a predetermined voltage ratio is set in advance as shown in FIG. 18, and thereby, the construction in which resistances can be formed in the transparent electrodes and the voltages in the desired voltage ratio can be applied to the respective pattern electrodes with resistance partial pressure.

In this case, the control lines to the respective pattern electrodes can be reduced.

The entire disclosure of Japanese Patent Application No. 2003-102739 filed on Apr. 7, 2003 including the specification, claims, drawings and summary is incorporated herein by reference in its entirety.

What is claimed is:

1. A liquid crystal panel disposed on an optical path of a light beam for compensating wavefront aberration that occurs between an optical axis of the light beam and an information recording surface in an recording medium by providing phase difference to the light beam, the panel comprising:
    a first electrode portion constituted by plural partial electrodes for providing phase differences different with respect to each of the partial electrodes to the passing light beam; and
    a second electrode portion disposed adjacent to the first electrode portion and constituted by at least one partial electrode for providing phase difference different from those of the first electrode portion to the passing light beam;
    wherein the second electrode portion provides phase difference to the passing light beam by the partial electrode in the case where misalignment within a plane perpendicular to the optical axis occurs between a position of a central axis of a condensing device for condensing the light beam on the information recording surface and a position of a central axis of the liquid crystal panel,
    wherein the second electrode portion is provided outside a range of luminance flux of the light beam,
    wherein the first electrode portion includes a long-and-narrow partial electrode adjacent to the second electrode portion; and
    wherein a majority of the long-and-narrow partial electrode is provided inside the range of the luminance flux of the light beam.

2. A liquid crystal panel according to claim 1, wherein the respective partial electrodes in the first electrode portion are constructed in forms corresponding to distribution of the wavefront aberration on a pupil plane of the condensing device.

3. A liquid crystal panel according to claim 1, wherein the second electrode portion has a plurality of the partial electrodes, and the respective partial electrodes are constructed in line symmetrical forms with an axis of symmetry perpendicular to a direction of the misalignment as a center.

4. A liquid crystal panel according to claim 1, wherein the respective partial electrodes provide the phase differences different with respect to each of the respective partial electrodes at a predetermined constant ratio.

5. A liquid crystal panel according to claim 1, wherein, when the recording medium is a disk-form recording medium, the passing light beam is provided with phase difference in the case where the misalignment occurs in one of a radial direction and tangential direction in the disk-form recording medium.

6. A liquid crystal panel according to claim 1, further comprising an electrode part having the first electrode portion and the second electrode portion in one surface and the other surface of the liquid crystal panel through which the light beam passes, respectively,
    wherein the first electrode portion provided on the one surface compensates the wavefront aberration caused by inclination between the optical axis of one of the radial direction and tangential direction and the information recording surface, and
    the second electrode portion provided on the other surface compensates the wavefront aberration caused by the inclination of one of the radial direction and tangential direction different from that for the first electrode portion.

7. A liquid crystal panel according to claim 1, wherein the second electrode portion is provided completely outside the range of luminance flux of the light beam.

8. A liquid crystal panel according to claim 1, wherein an edge of the partial electrode of the second electrode portion substantially coincides with a boundary of the range of luminance flux of the light beam.

9. An optical pickup comprising:
    a liquid crystal panel disposed on an optical path of a light beam for compensating wavefront aberration that occurs between an optical axis of the light beam and an information recording surface in an recording medium by providing phase difference to the light beam;
    a light source for outputting the light beam;
    a voltage applying device for providing the phase difference to the light beam by applying voltages to respective first partial electrodes and second partial electrodes;
    a condensing device for condensing the light beam passing through the liquid crystal panel on the recording medium; and
    a light receiving device for receiving the light beam condensed by the condensing device and reflected from the recording medium and outputting a light reception signal,
    the liquid crystal panel including:
    a first electrode portion constituted by plural partial electrodes for providing phase differences different with respect to each of the partial electrodes to the passing light beam; and
    a second electrode portion disposed adjacent to the first electrode portion and constituted by at least one partial electrode for providing phase difference different from those of the first electrode portion to the passing light beam,
    wherein the second electrode portion provides phase difference to the passing light beam by the partial electrode in the case where misalignment within a plane perpendicular to the optical axis occurs between a position of a central axis of the condensing device for condensing the light beam on the information recording surface and a position of a central axis of the liquid crystal panel,
    wherein the second electrode portion is provided outside a range of luminance flux of the light beam,
    wherein the first electrode portion includes a long-and-narrow partial electrode adjacent to the second electrode portion, and wherein a majority of the long-and-narrow partial electrode is provided inside the range of the luminance flux of the light beam.

10. An optical pickup according to claim 9, wherein the second electrode portion is provided completely outside the range of luminance flux of the light beam.

11. An optical pickup according to claim 9, wherein an edge of the partial electrode of the second electrode portion substantially coincides with a boundary of the range of luminance flux of the light beam.

12. An information reproducing apparatus comprising:

an optical pickup including a liquid crystal panel disposed on an optical path of a light beam for compensating wavefront aberration that occurs between an optical axis of the light beam and an information recording surface in an recording medium by providing phase difference to the light beam, a light source for outputting the light beam, a voltage applying device for providing the phase difference to the light beam by applying voltages to respective first partial electrodes and second partial electrodes, a condensing device for condensing the light beam passing through the liquid crystal panel on the recording medium, and a light receiving device for receiving the light beam condensed by the condensing device and reflected from the recording medium and outputting a light reception signal; and a reproducing device for, when information is recorded in the recording medium, reproducing the information based on the light reception signal, the liquid crystal panel including:

a first electrode portion constituted by plural partial electrodes for providing phase differences different with respect to each of the partial electrodes to the passing light beam; and a second electrode portion disposed adjacent to the first electrode portion and constituted by at least one partial electrode for providing phase difference different from those of the first electrode portion to the passing light beam, wherein the second electrode portion provides phase difference to the passing light beam by the partial electrode in the case where misalignment within a plane perpendicular to the optical axis occurs between a position of a central axis of the condensing device for condensing the light beam on the information recording surface and a position of a central axis of the liquid crystal panel, wherein the second electrode portion is provided outside a range of luminance flux of the light beam, wherein the first electrode portion includes a long-and-narrow partial electrode adjacent to the second electrode portion, and wherein a majority of the long-and-narrow partial electrode is provided inside the range of the luminance flux of the light beam.

13. An information reproducing apparatus according to claim 12, wherein the second electrode portion is provided completely outside the range of luminance flux of the light beam.

14. An information reproducing apparatus according to claim 8, wherein an edge of the partial electrode of the second electrode portion substantially coincides with a boundary of the range of luminance flux of the light beam.

* * * * *